United States Patent Office 2,969,490
Patented Jan. 24, 1961

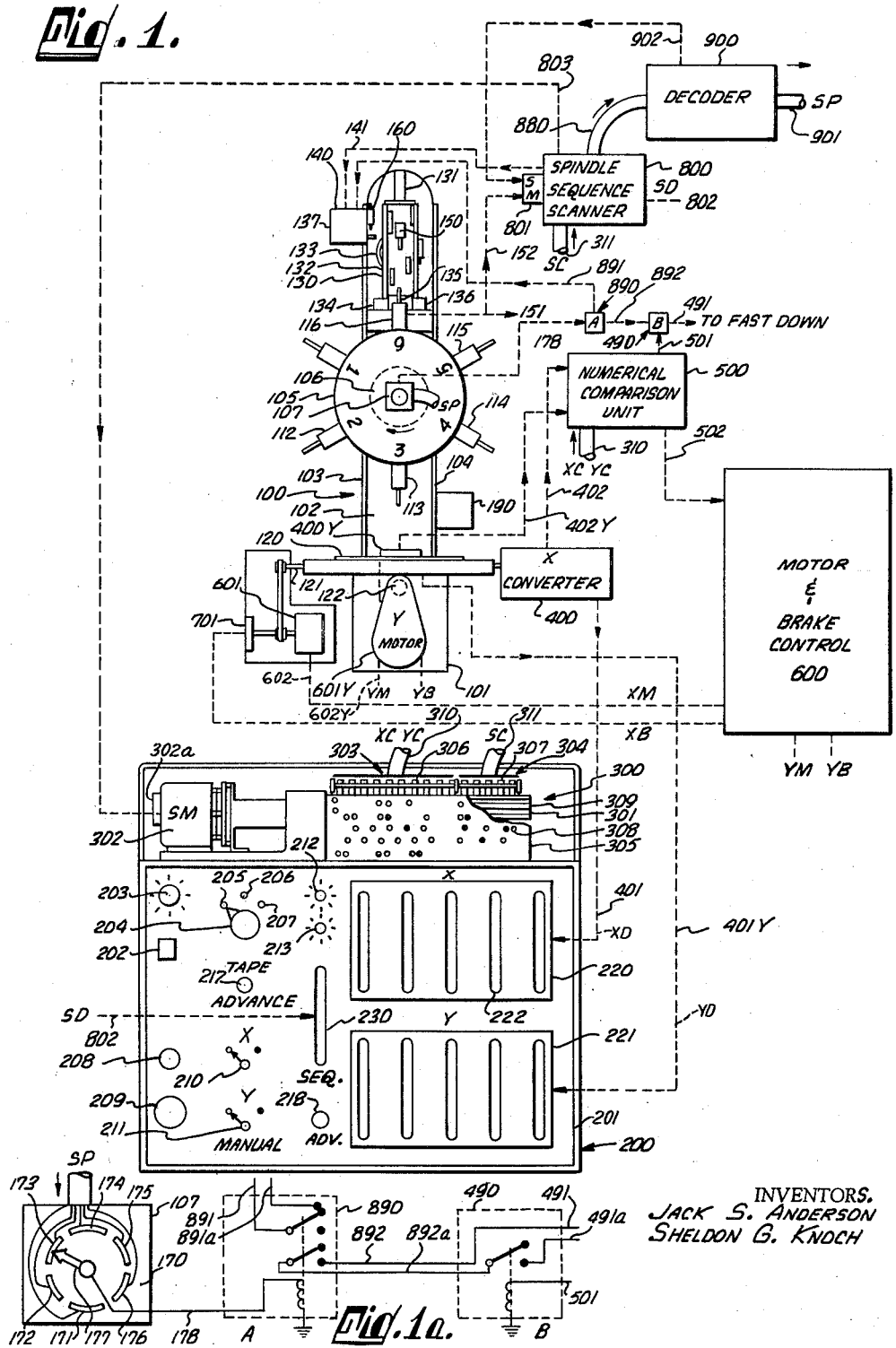

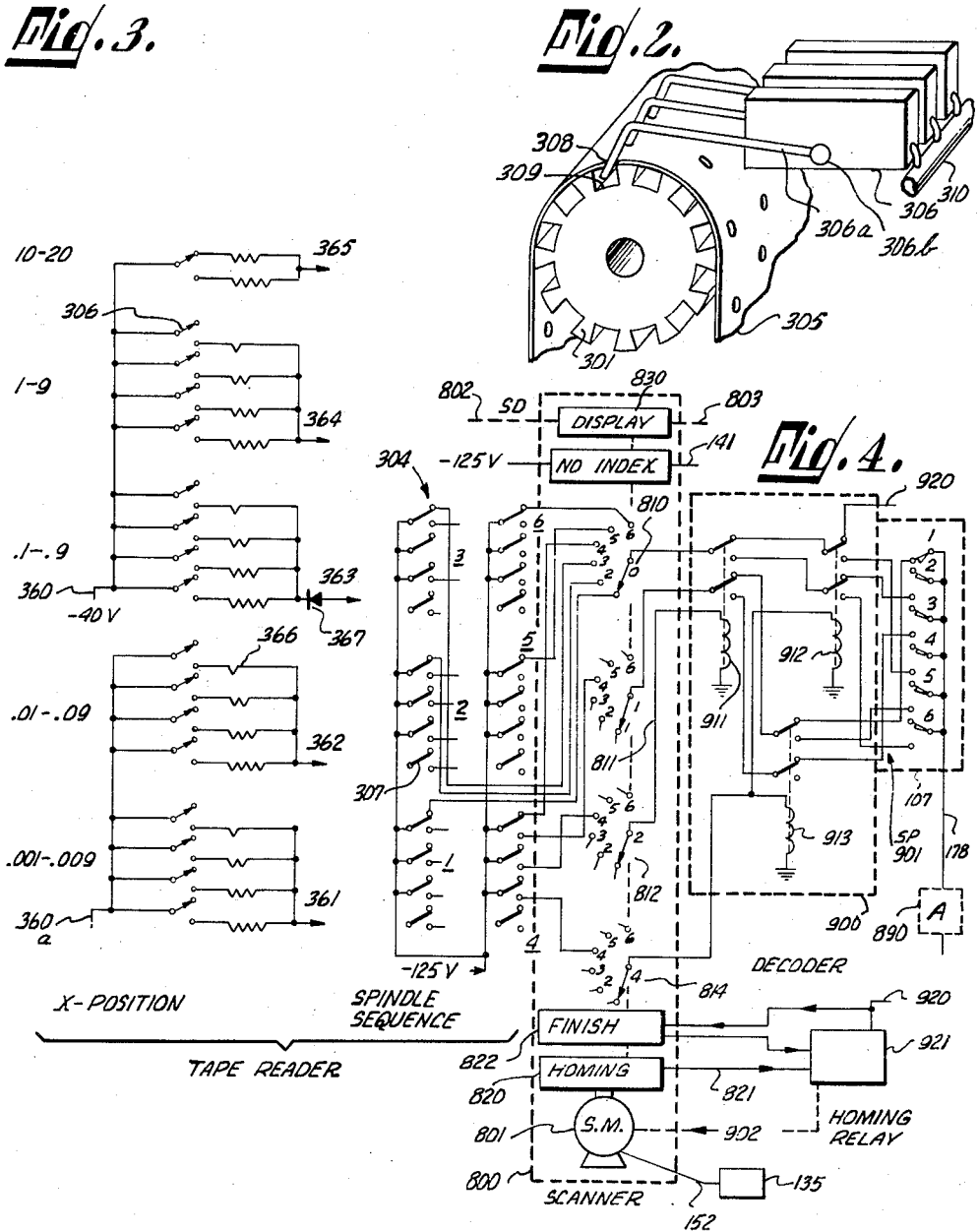

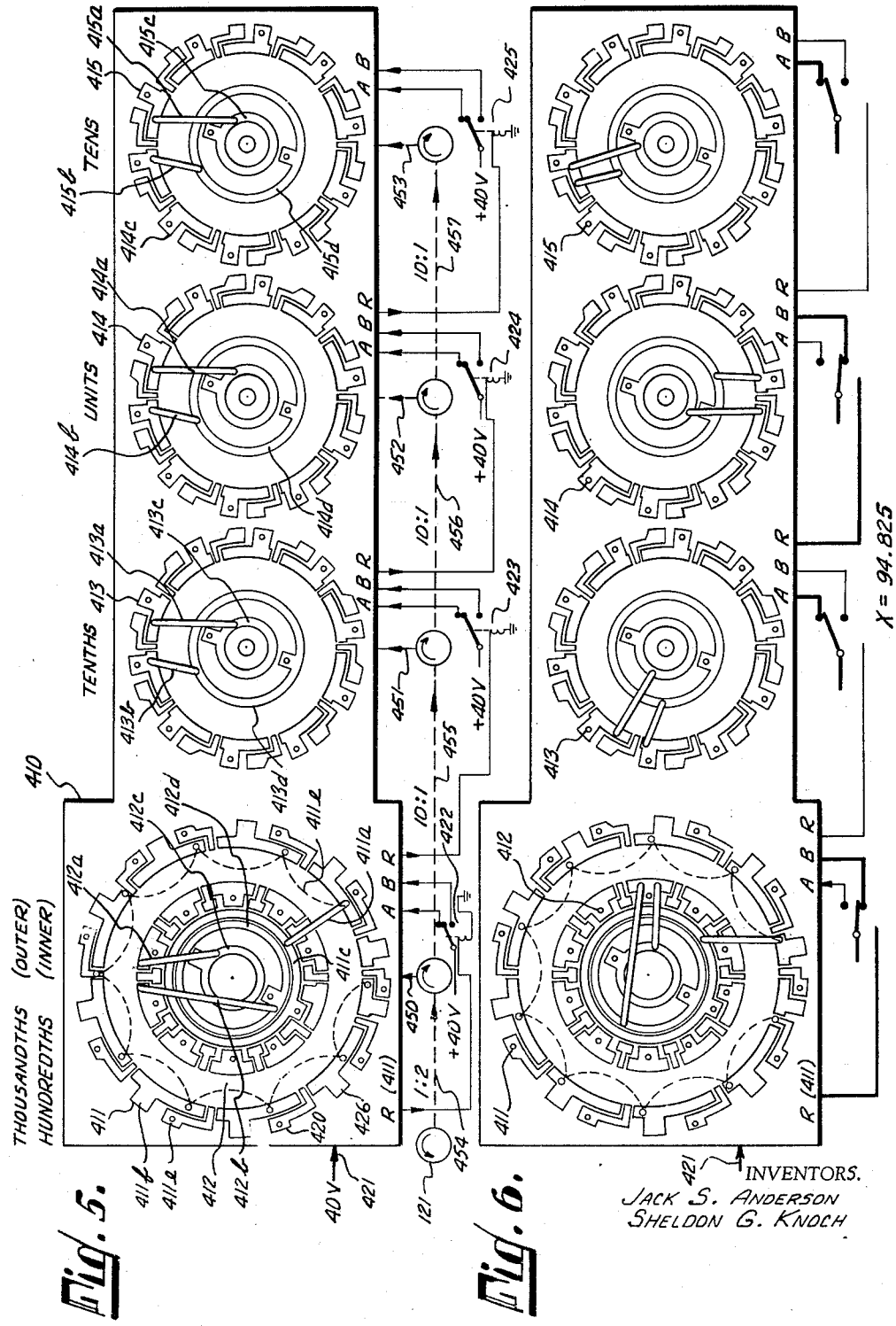

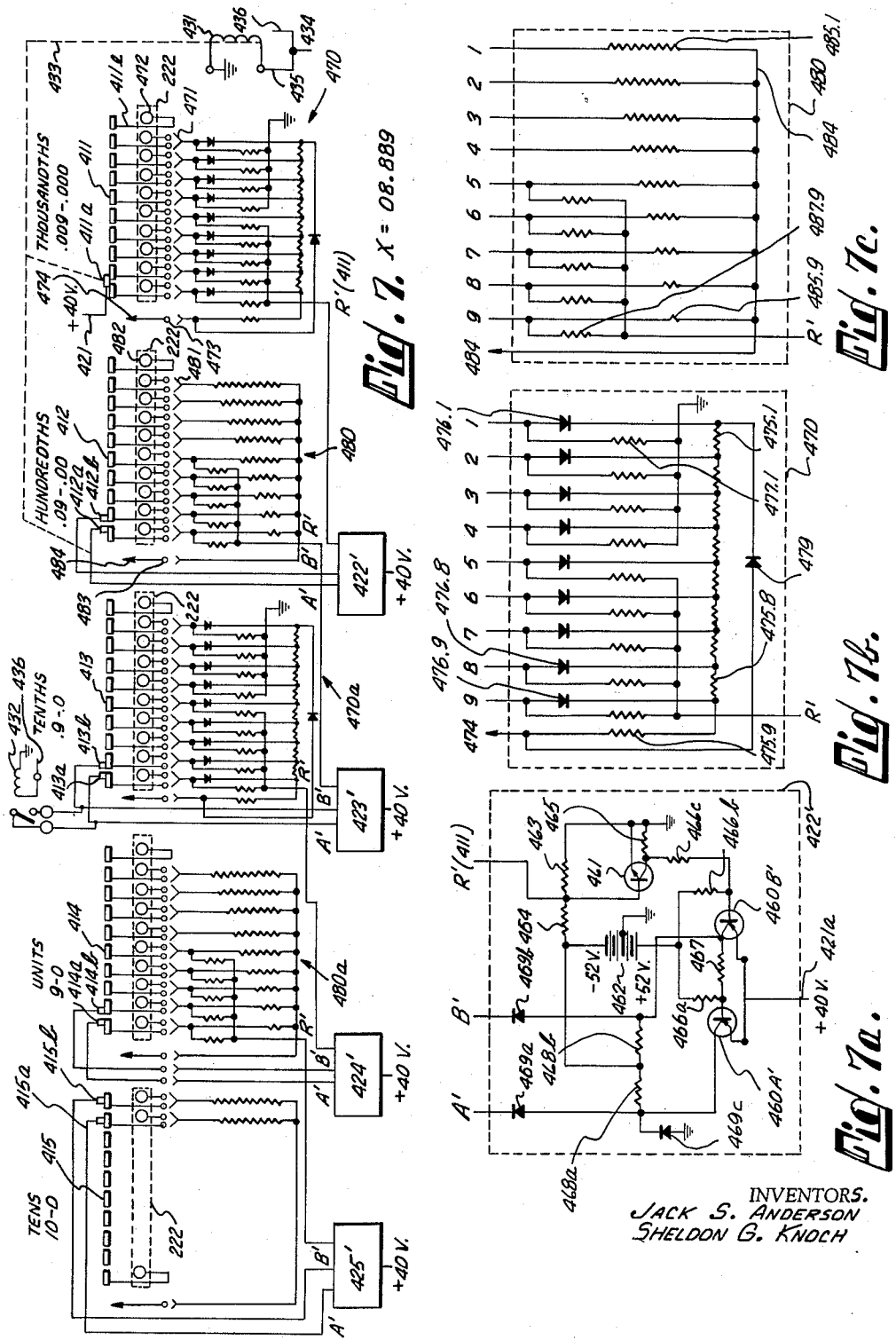

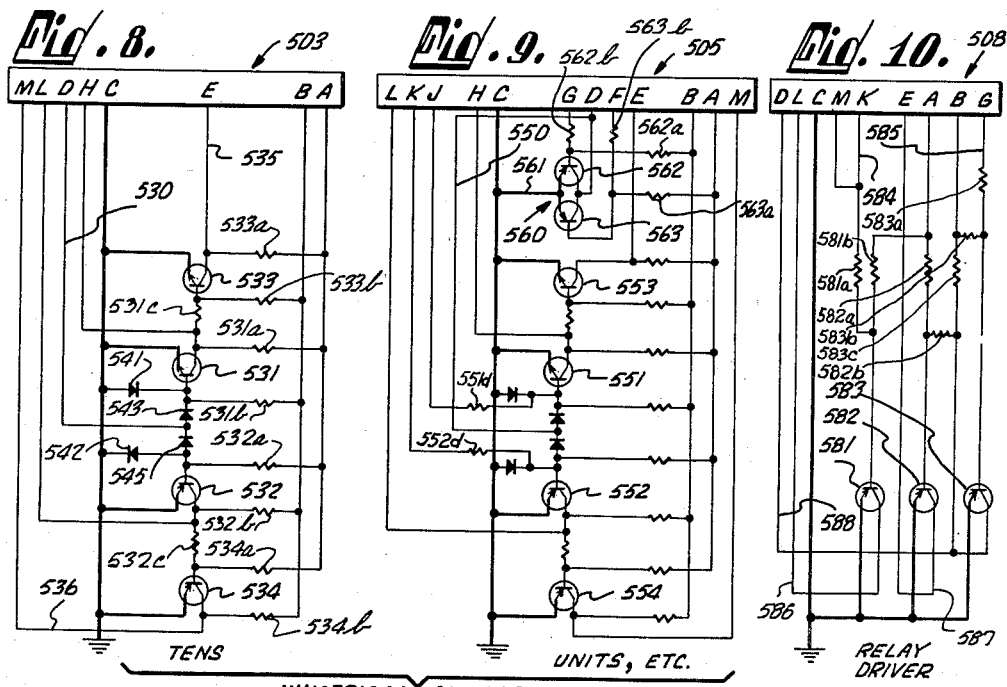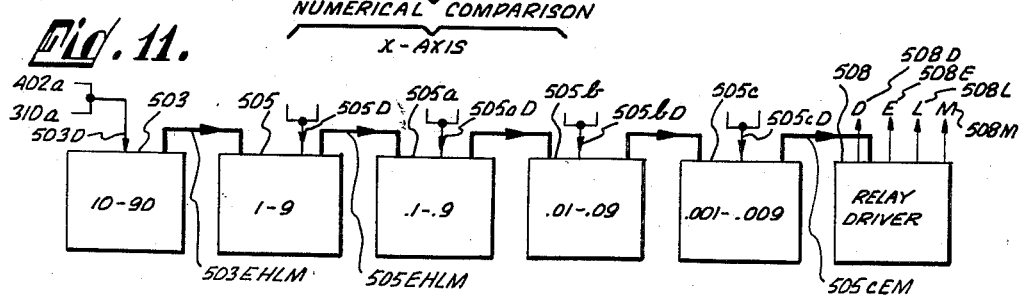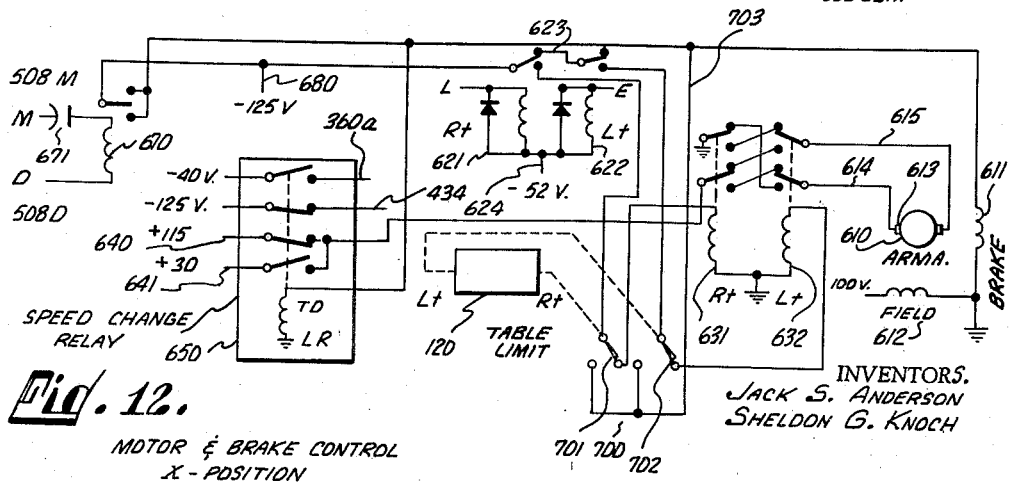

2,969,490

AUTOMATION WITH DIGITAL POSITION-COMMAND COMPARISON

Jack S. Anderson, Pasadena, and Sheldon G. Knoch, Sherman Oaks, Calif., assignors to Electrosystems Incorporated, Burbank, Calif., a corporation of California Filed June 10, 1958, Ser. No. 744,030

24 Claims. (Cl. 318—162)

This invention relates generally to automation systems such as those employed in connection with machine tool operation, and more particularly to a system in which numerical commands are in comparison at all times with numerical indices of physical disposition of the machine tool for the particular instant, without reference by counting, or otherwise, to any previous state or operation of the machine. In its preferred form, the invention employs electronic means for comprising a digital command signal from a tape, with a digital position signal from a commutator-type position reader. A more particular preferred form employs commutation-type reading discs which include a vernier means to read a plurality of decades on a single disc.

Automation of machine tools is currently a major industrial research and development project. The word "automation" has been newly coined as a name for the act or process of making a machine capable of performing a sequence of operations in accordance with a program of commands, without human operation after submission to the machine of the program of commands. The word "automation" will also be used herein in a second sense as the name for a machine, or a system of machines, which is capable of operating in the manner sought by the automation process, namely, automatically performing a series of operations pursuant to a program of commands.

Although automation systems are at present popularly considered principally in connection with machine tools, their utility is not limited to machine tool applications. Particularly, the present invention, although described in connection with a machine tool, may find even greater utility as an inspection tool. Thus, the present invention may be used to apply an assortment of inspection gauges, instead of cutting tools, to many different locations in a work piece, pursuant to a program of commands, and to signal automatically the presence of an error, if any. The present invention may be used in other applications in which automation systems are useful, for example in fire control and navigation, or process control in petroleum or chemical processing plants.

The most obvious advantage of automation is that performance of several operations by an automatic machine saves the labor cost of manual operation, if the human operator can be relieved for substantial periods of time, or a relatively unskilled and therefore less expensive operator may be used for feeding program information to a machine, which is then capable of executing the commands with the required precision.

However, the savings in labor cost of the operator is probably less important in most cases than other savings. For example, the percentage of defective parts is likely to be reduced by automation. Even skilled operators tend to make increasing numbers of errors when called upon to carry out the same complex sequence of operations in tedious repetition. Errors in manual operation may prove especially costly if they occur on a work piece which has already advanced through so many stages of manufacture that it represents a substantial investment. The value of an automation system is therefore greatly increased if it can accept a long series of commands from a simply prepared program; the present invention has the feature to an outstanding degree.

A third advantage of automation which often outweighs both the labor cost factor and the percentage of defective parts factor is the factor of tooling-up time. In a typical case in which a complex part is required to be made by a series of many precise machine operations, it may take several days merely to construct a suitable jig, or other tooling, to enable an operator to make a dozen pieces. An attempt to produce the pieces without proper jigs might develop into a month-long task to make the parts by precise manual setting of the machine for each machine tool operation. Some machines which are referred to as automation systems do not solve this problem. Others, particularly the present invention, eliminate the need for jigs. In the present invention, a program of commands may be prepared for the machine within a few hours, and the first part may be available on the same day upon which its design was completed.

Many of the machine systems recently developed and falling within the broad category of automation systems are primarily designed for carrying out a very few simple operations. Most of these previously known systems have been unsuitable for performing a large number of operations pursuant to a program of many commands because of the accumulation of errors from each successive operation in the program. Thus, no single error might render a part unsatisfactory, but the accumulation of errors would make the last operations in a series produce processes falling farther and farther outside of tolerance. It is an important advantage of the present invention that errors are not cumulative from operation to operation. For example, in a machine tool, the cutting tool and the work piece are positioned for each operation by a command directly from the program, without regard to any preceding command or series of commands on the same program, and without regard to how accurately any preceding operation was executed. In the present invention, when the work piece is moved from one position to another, it is not by a process of counting the distance from a location specified in a previous operation. Instead, the work piece is moved to a position relative to a base position, which is the same for all operations in the program.

Another important distinction of the present invention over almost all previously known automation systems is in its adaptability to mixed automatic and manual operation. In any highly complex machine tool, or similar device for inspection or control of some kind, it is often desirable to interrupt automatic operation for some manual adaptation to special circumstances, or for testing and resetting the machine itself. Most previously known automation systems cannot be safely interrupted at any desired stage in the execution of operations in a long and complicated program. It is an important feature of the present invention that the automation system will not lose its place, or repeat itself, or skip steps, unless so ordered, if the automatic operation is interrupted at any stage for some manual modification of the program.

Another important feature of the present invention, incidental to the feature described in the preceding paragraph, is that its proper execution of the operations in the program is in no way affected by power interruption, once power supply is resumed. Many automation systems heretofore known are vulnerable to any momentary failure in the electric power supply, and must not be restarted after line voltage is re-established, without extensive manual adjustment or preparation of the system.

Many automation systems have a scale of some types for indicating the position of the work piece or the location of the cutting tool, or other device. However, in most automation systems, the indicated location or position is derived from the machine tool in two independent ways, one for display purposes, and one for the servo-control relationship with the command producing part of the system. This has the serious disadvantage that the operator cannot be certain that the machine position which he observes on his visual indicator is the same which is being transmitted to the automation system. In the present invention, however, the display of machine position information is independent of possible electrical defects which may occur in the positioning system. Thus the position is known and can be checked at any time to determine correct operation of the automatic positioning system. The position sensing device produces two independent sets of signals from a single set of contact closures, the first being a set of display signals and the second set for position comparison purposes.

A feature of the present invention which makes for reliability and precision is that comparison between command and position in the automation system is not of the ordinary analog type, but is a comparison of separate electric currents for each digit common to a pair of numbers, one for the command and one for the position. Moreover, the two currents are not compared on a completely analog basis; instead, the currents have a value on a step-type scale, each step of which corresponds to a number, regardless of minor variations. Finally, comparison is between negative line voltage for the command, and positive line voltage for the position, so that any fluctuation in line voltage diminishes the two compared currents equally, and has no effect on comparison of their step-indicated values.

Still another important advantage of the invention is its lack of amplifiers. Amplifiers, as employed in most previously known automation systems, introduce characteristics of non-linear response which are disadvantageous in precise machine operation. In the present invention, the system is comprised of relays or their equivalents, so that every change is of a positive discriminate type which selects between only two possible choices.

The use of numerical comparison in the manner of the present invention for continuously detecting the instantaneous error between command and position makes possible the use of switch-type summing circuits employing semiconductors. Thus, important elements of the circuits can be mounted boards carrying printed circuits, diodes or transistors, and suitable resistances, which boards are readily removed and replaced by plug-in connections.

A unique feature of the present invention is the manner in which it converts the rotational position of a positioning screw in the machine tool or other device to a set of current values, a separate current for each digit in a position-value number, within a step-type scale of current signals. A series of gear connected commutators are used for operating brushes over a commutator system of novel design. Particularly, the commutator system used for converting the rotational position of the positioning screw to a series of stepped currents corresponding to digits of the position-indicating number employs at least one fewer commutator shafts than the number of digits, in the preferred form of the invention.

The foregoing and many other advantageous features of the automation system of the present invention will be understood from the following description of a specific embodiment of the invention as it applies to the automation of a turret drill.

In the illustrated specific embodiment, the automation system receives its program of commands from a plastic tape, preferably Mylar 0.005" thick, and in the embodiment illustrated, about 10" wide. The tape is punched with a number of holes which actuate a set of snap-action switches, for example, microswitches, the operative fingers of which assume one disposition or the other depending upon the presence or absence of a hole in the tape row presented at a given time to the row of reading switches. However, it will be appreciated that any type of programming system might be employed. For example the commands might be printed on a plastic tape in a manner which would indicate to a photoelectric cell reader the command desired. An iron coated tape might be employed for a magnetic reader.

A specific embodiment of the invention described in detail below is illustrated in the accompanying drawings in which:

Figure 1 is a schematic representation of the automation system of the present invention as applied to the operation of a turret drill;

Figure 1a is a wiring and schematic diagram of turret control relays A and B in Figure 1;

Figure 2 is a fragmentary view of a microswitch tape-reader employed in the particular embodiment illustrated;

Figure 3 is a wiring diagram revealing the manner in which 17 of the tape-reading microswitches serve to generate an X-position command; the additional switches shown (381, 382, 383, 384) are for additional functions to be explained later;

Figure 4 is a combination wiring diagram and schematic representation to show the manner in which twenty-four microswitches of the tape-reader of Figure 2 are employed to issue a command for a sequence of several spindle operations for each tape position; Figure 4 includes the spindle sequence reading microswitches, a scanner for considering each spindle operation in turn, and a decoder for converting to a decimal spindle number the binary-decimal command received from the spindle sequence microswitches of the tape-reader via the spindle sequence scanner;

Figure 5 is partly an actual plan view of a commutator system linked by a gear train to a positioning screw for the X-position of the table of the turret drill of Figure 1; Figure 5 includes, also, a schematic representation of the gear train interconnection between the positioning screw and a brush system moving over the printed circuit commutators illustrated;

Figure 6 is another plan view of the printed circuit commutator of Figure 5, showing the brushes in a new position;

Figure 7 is a diagrammatic representation of the analog-decimal converter which produces an electrical signal for each digit in the decimal value of X for a particular table position, as indicated by the relative disposition of the brushes and commutator system of Figures 5 and 6; Figure 7a is a transistor relay used in the analog-decimal converter of Figure 7 for transferring power between the lead and lag brushes; Figures 7b and 7c are enlarged wiring diagrams of the current-stepping circuits of the analog-decimal converter of Figure 7;

Figures 8, 9 and 11 are diagrammatic representations of a numerical comparison system by means of which the actual X-position of the drill table, indicated by means of the analog-decimal converter illustrated in Figures 5, 6 and 7, is compared with the command for a desired X-position issuing from the X-position tape-reading system of Figure 3;

Figure 10 is a motor and brake relay driver which receives the error detected by the numerical comparison system of Figures 8, 9 and 11, and directs the motor and brake control for the X-axis to move the drill table to the command position; and Figure 12 is a diagrammatic representation of the motor and brake control for the X-position of the drill table.

In Figure 1 an automatic system for carrying out a large number of drill operations on a workpiece rigidly mounted on the movable table of a turret drill is schematically illustrated. For convenience in identifying various parts, each of the major components of the system is designated by a number in the hundreds, and all subcomponents within or associated with a major component are indicated by numbers of the same centennial series. The major parts may be listed as follows:

| | |
|---|---|
| A six-spindle turret drill with movable table, for example, the Burgmaster Drill manufactured by the Burg Tool Manufacturing Company of Gardena, California | 100 |
| A tape-reading and control console | 200 |
| A tape-reader located in the upper part of console 200 | 300 |
| An analog-decimal converter associated with the movable table of the drill 100 and adapted to convert a mechanical detection of the X-position of said table to a decimal electric signal | 400 |
| An analog-decimal converter for the Y-axis of the table position, similar to the X-axis converter 400 | 400Y |
| A numerical comparison unit, illustrated hereinafter in Figures 8, 9 and 11, for comparing the actual table position as indicated by a signal transmitted via converters 400 and 400Y with X and Y positions commanded by the tape-reader 300 | 500 |
| A motor and brake control system for driving an X-position motor for the table of turret drill 100 in a direction and at a rate based upon the sign and amount, respectively, of error indicated by the numerical comparison unit 500 | 600 |
| A brake control system for the brake on the X-position motor | 700 |
| A spindle sequence scanner for receiving a spindle sequence command from the tape-reader 300, which simultaneously informs the scanner of all the spindle operations and their sequence, required for a given tape-reading position, and issues successive commands in proper sequence for the successive operations desired of the turret of the drill 100 | 800 |
| A binary-decimal decoder for receiving a spindle designation in binary-decimal numbers and converting said designation to a decimal number for specifying the proper spindle for a particular operation | 900 |

The turret drill 100 has a massive cast-iron base 101, from the back of which a strongly constructed vertical column 102 extends upwardly. Column 102 is provided with vertical machined tracks 103 and 104, upon which a rotatable spindle-carrying turret 105 is vertically movable, preferably by a hydraulic system not shown. Turret 105 carries six drill spindles indicated by the numerals 111–116, respectively, and is rotatable by a turret-rotating means 106, located at the rear of the column 102 indicated schematically by a dashed line circle. Preferably, the rotating means 106 includes an electric motor located behind the column 102 (and therefore not visible in Figure 1) which, through a Geneva drive, either rotates the turret (when it has been retracted to its maximum height), or spins whichever spindle is in cutting position, i.e. pointing vertically downward (whenever the turret has descended from maximum up position and is either feeding toward or into the work, or being retracted therefrom); a spindle-position switch 107 mounted at the front of the turret 105, and, as seen in Figure 1a, is comprised principally of a non-rotating section 170 with six segments, 171–176, one for each spindle, and a radial switch member 177 rotatable with the rotation of the turret 105. Spindle-position switch 107 thus provides a position sensing part of turret control circuitry to be described hereinafter. The particular arrangements of X and Y axis positioning screws, or other table-positioning means, do not form part of the present invention, and may be of any suitable means for accurate machine positioning, including the usual design employing a lower table movable in one direction and an upper table transversely movable on the lower table.

Associated with the turret 105, and movable in response to both vertical turret position and spindle position, is a micro-switch-operating drum 130, which slides vertically on a shaft member 131 with feeding and retraction movement of turret 105, and rotates about a vertical axis of shaft 131 with the rotation about a horizontal axis of the turret 105. Thus, as the turret 105 rotates, or to use the term usually employed in the machine tool art, "indexes," the drum 130 which is polygonal in horizontal cross section presents to forward position a face corresponding with a specific associated spindle.

Preferably, the drum 130 has one or more faces 132 corresponding to each of the six spindles. On each of the faces 132 one or more microswitch-operating cams 133 is adjustably mounted. Some of these microswitches are indicated schematically by the small boxes 134, 135, and 136 clustered about the base of the drum 130, as it is viewed in Figure 1. The central microswitch 135 is a depth limit microswitch which, when it senses that the drum has descended to a position corresponding to the full depth of cut for the particular operation involved, transmits a signal to a hydraulic turret feed means 109, causing it to reverse and elevate the turret 105 to its uppermost, i.e. indexing, position. The associated microswitches 134 and 136 are fast-up and slow-up controls respectively; slow-up may be required for withdrawing a cutting tool from a threaded bore hole. At the upper limit of its travel, one of the cams 133 engages an indexing microswitch 137, which causes the turret rotating means 106 to begin rotating the turret 105. Turret rotation in the up position is continuous, until indexing is brought to a halt by signal from the spindle sequence scanner 800 that the proper spindle for the next operation has arrived in cutting position, as will be described hereinafter.

The foregoing description relates to a turret drill 100, suitable as a component part of an automation system constructed according to the present invention, although it will be understood that the invention applies equally well to the automation of machine tools in which it is the cutting tool instead of the workpiece which moves to various X and Y locations, and it is the workpiece instead of the cutting tool which moves successively to a series of cutting positions. Thus, the invention might be applied to a contour machine, or the like, in which a contour was produced by cutting an X—Y path in a series of planes through the workpiece.

All the essential controls for both manual and automatic operations of the turret drill 100 are housed in a control console 200, which is provided also with an instrument panel 201 upon which indicating instruments are mounted to keep the operator informed as to the condition of the controlled tool, and the disposition of its movable parts. Thus, the console 200 and the drill 100 are placed in connection with an electric power line (not shown) by throwing an "on" switch 202; an "on" light 203 indicates that the power is on.

A switch 204 provides the operator with means for selecting the mode of operation of the drill 100; "Manual" 205, "Semi-automatic" 206, or "Automatic" 207. Operation of the tool 100 is started by pressing appropriate buttons on tool panel 190, including a master "Start" button 208. Once the sequence of operations has been thus started, operation continues until halted by tape command, or by pressing the "Stop" button 209.

When switch 204 is placed in manual position, the switches 210 and 211 may be used to move the table 120 in either direction along the X and Y axes, respectively. Also, when switch 204 is in manual position, the turret 105 may be rotated, and the hydraulic feed 109 may be controlled, as desired, by conventional manual machine tool means, not showing in the accompanying drawings, and not forming any part of the present invention.

The small signal lights 212 and 213 are provided, respectively, to indicate that the machine is operating and that the machine is ready to operate.

In the upper part of the console 200, a tape-reader 300 is provided as a source of the commands which make the operation of the turret drill 100 entirely automatic, if desired. The tape-reader 300 is comprised principally of a tape-reading drum 301, also seen in Figure 2, a step motor 302 for rotating the tape drum 301 through rotational steps of a predetermined angle, a table-position reading system 303, a spindle sequence reading system 304, and a program tape 305.

Tape-reading is accomplished by 58 microswitches, 34 for the X and Y axis positions being indicated by the numeral 306, and 24 for the six possible spindle operations for a given X and Y position being indicated by the numeral 307. As seen in the perspective detail view of Figure 2, the microswitch, typically a microswitch 306 in the table-position reading system 303, is operated by a sensing finger 306a, which is pivoted in the microswitch 306 at 306b. When a step rotation of the drum 301 brings command information comprised of a transverse row of holes 308 under the sensing fingers 306a, wherever a hole appears, the sensing finger 306a drops into a longitudinal slot 309 in the surface of the drum 301, causing the microswitch 306 to change from one switching position to another.

The X and Y commands indicated by the letters XC and YC respectively are transmitted from the microswitches 306 by a multiple conductor conduit 310 to a numerical comparison unit 500, through a resistor assembly to be described hereinafter in connection with Figure 3.

The spindle sequence commands, indicated by the letters SC, are transmitted from the spindle sequence sensing system 304 through a multiple conductor cable 311 to a spindle sequence scanner 800, to be described hereinafter in connection with Figure 4.

Instrument panel 201 is provided with a pair of table position indicating display boards 220 and 221 for X and Y axes, respectively, of the table loci. Each of the display panels 220 and 221 is provided with five vertically extended windows 222, which carry digits from 0 to 9, and which display a number up to five figures indicating decimally to the thousandth of an inch the particular value of X or Y for the table 120 at each and every instant. Display is accomplished in a manner well known to those familiar with the art of such instrumentation by means of ten lights behind each of the windows 222 and circuitry illuminating a light behind the proper digit. A similar window 230 serves to display to the operator the particular turret operational step which is under command by the spindle sequence scanner 800. The button 217 can be used to cause the tape 305 to advance to a new tape position, and the button 218 can cause the machine 100 to proceed with operations as commanded by the tape 305; both buttons 217 and 218 are operated only when the switch 204 is in the semi-automatic position 206.

The X and Y positions, which are mechanical analog information, are converted to digital numbers by means of a pair of analog-digital converters, 400 for X and 400Y for Y, the detailed construction of which will be described hereinafter in connection with Figures 5 to 7. It will be sufficient to state at this point that the converters 400 and 400Y produce, in a novel manner, a five digit figure indicating decimally the value of X or Y, from a zero table position, or other reference position.

The X converter 400 transmits an X display signal to the X display panel 220 by way of a multiple conductor X display line 401, also identified by the legend "XD." Similarly, the Y converter also transmits a display signal to the Y display panel 221 by way of a multiple conductor Y display line 401Y, also identified by the legend "YD."

Simultaneously, the X converter 400 transmits an identical signal current to a numerical comparison unit 500, the function of which will be explained hereinafter, by way of a multiple conductor line 402. A similar line 402Y is provided for transmitting information from the Y converter 400Y.

The numerical comparison unit 500 receives a table-position command in the form of five direct current signals for X and five direct current signals for Y from the table-position reading system 303 by way of the multiple conductor conduit, 310, and makes a continuous comparison between these command signals and signals corresponding to the X and Y coordinates of the actual table-position, transmitted to the numerical comparison unit 500 by way of multiple conductor lines 402 and 402Y. The difference between each of the five X-command-X-position signals and each of the five Y-command-Y-position signals, referred to in the servo art as error signals, is transmitted to the numerical comparison assembly 500. The numerical comparison assembly 500 combines the five signals from each axis to produce a single control signal for each axis. The control signals are transmitted by way of line 502 to the motor and brake control system 600.

The motor control unit relays within 600 are actuated by the error signal received over line 502 from numerical comparison unit 500, select the polarity of driving current transmitted to the table-positioning motors 601 and 601Y by way of lines 602 and 602Y, also designated by the letters XM and YM. The electric current is in the form of direct current flowing in a direction to rotate the positioning motor 601 (or 601Y) in a direction suitable to moving the work table 120 into the position commanded by the particular row of holes 308 in the program tape 305.

Simultaneously, the motor and brake control system 600 receives signals developed from the error over the line 502 from numerical comparison unit 500. These signals control the motor speed through the motor control relays 600 via line 602 (also indicated as XM) and the brake 701 on the X-positioning motor 601 by means of a current transmitted by way of line 702, also indicated by the letters XB. (The speed and brake control has a similar system for the braking of the Y-motor 601Y.)

The foregoing paragraphs have described the means by which, when a new row of tapes holes 308 is presented to the table-position command reading microswitches 306, the table 120 immediately begins to move toward a table-position coerresponding to the particular program step recorded on the tape 305 at that part which is, for the moment, under the tape-reading system 304. For a particular tape-position, the table 120 can assume only one X and Y position. It remains in that position until the tape advance step motor 302 rotates the tape 305 to a new program step.

Although the table 120 can assume only one position for a given program step (i.e. tape-position), the turret 105 may perform as many as six different operations, in any sequence required, for a single position of the tape 305, i.e., for a single program step. Thus, when the tape 305 steps forward to a new program step, and while table 120 is moving toward the position commanded by microswitches 306, the spindle command, transmitted by way of spindle command conduit 311 to spindle sequence scanner 800, causes the turret to rotate until it has reached the commanded spindle position and stops by means described hereinafter in connection with Figure 1a.

The operator is informed at all times as to the position of the spindle sequence scanner, i.e. which number operation in the series of six operations (for a given program step) has been reached, by display 230, the spindle sequence scanner having transmitted the cycle position by way of line 802, also indicated by the letters SD.

The spindle sequence command microswitches 304 are arranged in six groups of four each, as will be explained hereinafter, and one set of four microswitches is connected to the first position of each of four different rotary wafer switches in the scanner 800, as will be described hereinafter in connection with Figure 4. Similarly, another set of four microswitches are connected to the four operation number 2 switch positions in the scanner 800, and so on for each of the six possible operations at a given X-Y table-position, i.e., a given program step as indicated by one row of holes 308 in the program tape 305.

For the first spindle operation, the decoder 900 receives, over one or more of four wires from the number one position of the four rotary wafer switches of the scanner 800, a binary-decimal signal corresponding to the desired spindle number. In the decoder, a circuit including relays converts this binary-decimal signal to a unique energization of one of the six segments or switch positions in the spindle-position-indicating switch 107, which corresponds to the desired spindle. Meanwhile, the turret 105, now in the maximum up position, continually indexes, thus momentarily closing in turn each of the six switch members 171 to 176 of spindle position switch 107, until the commanded spindle is reached. When the latter occurs, the commanded segment receives current and transmits a signal through a common line 178, see Figure 1a, to the coil of relay 890 which may be referred to as the spindle-in-position relay.

Relay A890 transmits a hold signal by way of line 891 to the indexing switch 140, i.e., it opens indexing switch 140 to cause turret 105 to discontinue indexing, even though it remains in the up position because no down signal can be received by the turret vertical hydraulic system until the table 120 has arrived at the X and Y position of the program step.

At the same time that relay A890 is actuated to stop the indexing of the turret 105 by the spindle-in-position signal received over line 178 from the spindle position switch 107, it indicates to a relay B, indicated by the numeral 490, that the proper spindle is in position and the turret may be lowered if the table 120 is in position, or if it is not already in position, as soon as it arrives in position.

When relay B490 has received its two control electrical signals, a signal from numerical comparison unit 500 by way of line 501 that the table is in position, and a signal from relay A890 that the proper spindle is in position, it transmits a signal by way of line 491 to the fast-down control of the hydraulic cylinder controlling the vertical travel of the turret 105.

The turret 105 moves rapidly downward, but one of the cams 133 on the drum 132 has probably been set to trip switch 134 and cause the downward movement to suddenly decelerate as the spindle reaches the workpiece and the drill in the spindle begins to feed into the metal of the workpiece.

For each of the spindles 111 to 116, there is a depth limit trip 150 adjustably mounted on the surface of the drum 132. This trip engages the depth limit microswitch 135 when, as determined by the previous adjustment of trip 150, the spindle in cutting position has descended to the depth of cut desired.

When the depth limit switch 135 is touched, it simultaneously shifts the hydraulic cylinder from down-feed to up, by signal transmitted by line 151, to a hydraulic system (not shown), and causes the step motor 801 of the spindle sequence scanner 800 to advance one step to position number two, by means of a signal transmitted through line 152.

Position number two of the wafer switches then selects a second group of four switches in the tape-reader which in turn operate the relays of the decoder to energize the switch in spindle position switch 107 which corresponds to the spindle desired for the second spindle operation of the program step. Thus, the cycle is repeated until all the spindle operations desired for the particular program switch have been performed.

When the six (or fewer), spindle operations have all been scanned and executed, there will be a zero signal through the decoder network through wafers 810, 811, 812 and 814 and line 920 to a sequence homing relay 921 through homing wafer 820 and line 821. Relay 921 will remain locked in energized position through the action of the holding wafer switch 822. Homing wafer switch 822 holds homing relay 921 in energized position and also prohibits any movement of table 120 until the scanner motor 801 has returned to the scanner position number one.

As the spindle sequence scanner indexes around through the arc positions between position six and home, it momentarily energizes a tape-reader step motor relay through the display wafer 830 and line 802. This energization, while very brief, is enough to initiate the timing cycle of the tape advancement motor 302. The latter is energized through a time-delay relay 302a which needs only a very brief energization to be started, and once started, completes its cycle. It transmits an impulse by way of line 803 to the tape-reading step motor 302, causing it to rotate the drum 301 one step, and place a new program step, i.e., a new row of holes 308 under the microswitches 306 and 307.

New X and Y position commands are presented to the numerical comparison unit 500 by the one step advancement of tape 305, but the table 120 does not begin to move toward the commanded X and Y until the turret 105 has returned to its up position. The turret 105 cannot begin indexing to find the new spindle position required by the spindle command for the first operation for the new program step until the turret 105 has retracted upwardly to its up position and has tripped a begin-indexing microswitch 160, which is part of the up position switch 137. When, however, maximum "up" position has been reached, and the microswitch 160 has been operated, the turret 105 begins to index in the usual rotary manner, presenting one spindle after another to the downwardly pointed cutting position, simultaneously closing each of the switch segments 171 to 176 and the spindle position switch 107. When the switch 107 arrives at the segments corresponding to the spindle commanded for the first operation, it finds an electric voltage which operates relay A890 and thereby brings indexing to a stop as already described.

The foregoing paragraphs have presented the general operation of the system of the invention as applied to a turret drill. The detailed construction and operation of the important components will now be described in the following sections.

THE TAPE-READER 300

The tape-reader 300 has already been described as to mechanical operation in connection with the description of Figures 1 and 2. The electrical operation of the tape-reader 300 may be understood from Figure 3 and the left part of Figure 4.

Figure 3 is a wiring diagram for the seventeen microswitches employed to read the X-position command. The Y-position command microswitches are not illustrated, but it will be understood that the wiring diagram for Y commands is substantially identical for the X command diagram.

It will be seen that there are four microswitches for each digit in the five decimal places of values for X, except that only one microswitch is actually required for the tens digit in the particular machine illustrated as a specific embodiment. The reason for this is that the machine has a maximum table movement in one direction of only eighteen inches; consequently, positive values of X up to eighteen inches will cover its entire region of X-movement.

In Figure 3, it will be seen that the tape-reading microswitches for the position X, indicated by the numeral 306, are energized at minus forty volts from a voltage source connected to the switches through lines 360 and 360a.

There is a set of four microswitches for each of the five digits in the X-position number. Each set of four microswitches (excepting only one for the tens digit in the particular machine illustrated, for reasons already mentioned) is in the form of a current for each digit transmitted through the lines 361, 362, 363, 364 and 365. The magnitude of the current in each line corresponds exactly to the magnitude of the digit command, being determined by which of the microswitches 306 for particular set of four are closed. Note that in each set of four microswitches, the resistances 366 are graduated in magnitude as indicated schematically by their length in the drawing; the schematic indication suggests increasing magnitude, and not relative size of the resistances. A semi-conductor 367 is required in the output line 363 to balance a semi-conductor loss in the signal to numerical comparison unit 500 present in the tenths digit of converter 400.

The left part of Figure 4 illustrates the spindle sequence microswitches 307. It will be seen that there are six sets of four microswitches each, one set for each of the possible six spindle operations for a given program step. Each set of four can indicate, in binary code, any number from one to fifteen, but since six is the number actually utilized in the present system, only three switches in each group are connected since three switches can indicate any number from one through seven. The extra switch in each group is present to allow for future expansion of the system or to provide supplementary functions at the customer's option.

Although the entire six spindle operations are commanded by the disposition of the microswitches 307, the instant that the tape 305 presents a new program step to the tape-reading microswitches 307, only the microswitches from step one, indicated in Figure 4 by the numeral 1, are in connection with the decoder 900, since the scanner 800 connects only the number one operation contacts of the four rotary wafer switches 810, 811, 812 and 814. As already described, the microswitches of spindle operation number one thus determine which of the rotary wafer switches 810 to 814 is energized, and thereby determines which of the relays in the decoder 900 are energized. In the drawing of Figure 4, complete connections between microswitches 307 and rotary wafer switches 810 to 814 are shown only for spindle operation number 4. Also, the only rotary wafer switch shown completely connected is rotary wafer switch 810. It will be understood that the remaining wiring has been omitted only for clarification. The wiring from the operation microswitches for operations 1, 2, 3, 5 and 6 are precisely as shown for operation 4, except that they are directed to the correspondingly numbered terminals of the wafer switches 810, 811, 812 and 814. The rotary switches 811, 812 and 814 are connected to corresponding microswitches for each spindle operation, exactly as the completely illustrated connections for the rotary wafer switch 810. A voltage of about minus 125 volts is applied to the decoder, to energize the decoder relays 911, 912 and 913. It will be seen that the decoder relays 911 to 913 can be selectively energized by the connections with the rotary wafer switches 810 to 814 to energize any one of the spindle-position switches 1 to 6 in spindle position switch 107, thus transmitting the spindle-in-position signal to relay A890, as already described. In addition it can be seen that if none of the microswitches are operated by a hole in the tape, in any single operation step, the decoding circuit will permit line 920 to be energized when the scanner 800 has reached that step. Thus, a "zero" signal is presented to line 920 which, being connected to the relay 921, causes it to energize the homing wafer of scanner 800 which returns to "home" position.

X-POSITION ANALOG-DECIMAL CONVERTER

Figure 5 shows a printed circuit board 410, upon which there are printed five rotary sets of conductive segments, 411 to 415, 412 being concentric with 411. Each of the rotary sets 411 to 415 coresponds to one digit of the X-position, 411 for thousandths of an inch, 412 for hundredths of an inch, 413 for tenths of an inch, 414 for inches, and 415 for tens of inches. Every other printed segment is provided with a connection point in the form of a small circle indicated generally through all of the connected segments by the numeral 420. Alternate segments 426 between the connection segments 420, have no connection point, and are merely dummies, employed in the printed circuit for mechanical reasons, namely to provide smooth brush transfer between connected sgements 420.

It will be understood that reference to "printed circuit" is used in a generic engineering sense, including etched circuits or the like.

Associated with the thousandths segments 411 is a rotary brush assembly 411a of ten equally spaced, i.e. 36° apart, brushes internally connected in parallel (as indicated by dashed line 411e) and connected to slip ring 411c by the eleventh brush 411d. The thousandths segments 411 are so disposed around the commutation circle that each segment is equivalently equal to 36° plus 10%, or 39.6° apart, with the exception of segment number 9. Thus at any one position of the rotary brush assembly 411a, one or two brushes will be contacting individual segments 411. Rotation of the brush assembly 411a through one hundredth of a revolution (in a positive direction) will cause a given brush to move off one segment and cause the next succeeding brush, in the direction of rotation, to contact the segment which corresponds to the next larger digit. Thus ten brushes moving over ten segments can be employed to count one hundred in a single revolution of the brush assembly. It will be seen that the thousandths are read by having connected segment portions of only 3.6° width. However, the 3.6° connective segment portions each occupy a different position in its own 36° arc. Thus, the ten brush contacts (which are 36° apart) sweeping around the thousandths circle connect either only one or an adjacent pair of 3.6° segment portions at a time.

The inner or hundredths circle 412 employs two brushes, 412a and 412b, the former being a leading brush, and the latter a lagging brush. Brushes 412a and 412b ride at their inner ends on slip rings 412c and 412d respectively.

The other segment circles 413, 414 and 415 are likewise provided with leading and lagging brushes, identified by corresponding a and b numerals, riding on similarly identified slip rings, and driven by shafts 451, 452 and 453 respectively.

The brush rotating shafts 450, 451, 452 and 453 are driven by a gear train system beginning with the worm gear 121 which controls the X-position of the table 120 of the turret drill 100. The shaft 450 is driven at twice the revolutions of the worm shaft 121 by gear system indicated diagrammatically by the dashed line 454. The shaft 450, rotating clockwise, in turn drives the tenths shaft 451 at the rate of one revolution for every 10 revolutions of the shaft 450 by means of a ten to one reduction gear indicated schematically by the dashed line 455. Similarly, the unit's shaft 452 is driven at the rate of one revolution for each ten revolutions of the tenths shaft 451 by a gear reduction system indicated diagrammatically by the dashed line 456, and the tens shaft 453 is driven at the rate of one revolution for each ten revolutions of the unit's shaft 452 by a gear reduction system indicated diagrammatically by the dashed line 457.

An example of how the commutator system of Figure 5 indicates a number by the disposition of the brush systems on the faces of the segment circles 411 to 415, is illustrated in Figure 6, in which the various brushes have been rotated to positions to correspond to a value of X equal 94.825. Note that the number must read from right to left, nine being indicated at the right on segments 415, four on segments 414, eight on segments 413, two on segments 412, and five on segments 411.

The operative circuitry associated with the convertor 400 is illustrated in Figure 7, but before describing Figure 7, it will be helpful to consider a simplified representation of the operation of the electrical portion of the converter, as illustrated by the simple circuit associated with the commutator board 410 in Figure 5.

The simple relay system of Figure 5 may be taken as one species of convertor circuit, and the transistor system of Figure 7, to be described hereinafter, may be taken as a second species. However, the two systems are equivalents in function, and an understanding of Figure 5 will facilitate understanding of Figure 7.

For each decade, except the first, i.e. the thousandths decade segments 411, there are two brushes, a lead brush indicated by the supplementary letter $a$ and the lag brush indicated by the supplementary letter $b$. Thus, for the tenths decade, the lead brush is 413$a$ and the lag brush is 413$b$. In the case of the thousandths decade, only a single brush assembly 411$a$ is required.

Which of the two brushes, lead or lag, should be energized for a given decade depends on the digit in the next lower decade. Thus, the hundredths lead brush 412$a$ should be energized if the thousandths digit is zero, one, two, three, or four. But the hundredths lag brush 412$b$ should be energized if the digit in the thousandths decade is in the upper half of the decade, namely five, six, seven, eight, or nine.

Similarly, in the next decade, the tenths, the tenths lead brush 413$a$ should be energized whenever the hundredths digit lies in the lower half of the hundredths decade, but the tenths lag brush 413$b$ should be energized whenever the hundredths digit lies in the upper half of the hundredths decade. The same rule applies to each higher decade in succession.

Selection between the two brushes for each of the decades (except for the thousandths decade which has only a single brush 411$a$) is controlled by a lead-lag switching relay for each decade, relay 422 for the hundredths decade 412, relay 433 for the tenths decade 413, relay 424 for the units decade 414, and relay 425 for the tens decade 415. Each of the relays 422 to 425 is a two position relay actuated by a coil which is energized only when the next lower decade is in its upper half (i.e. five to nine inclusive). Each of the relays is connected to its associated decade by terminals A and B, the former for energizing the lead brush when the relay coil has not been energized by the next lower decade, and the latter for energizing the lag brush when the coil has been energized by the next lower decade.

Thus, in Figure 5, a 40 volts potential is applied to the thousandths decade through the thousandths slipring 411$c$ and the thousandths brush 411$a$ by power connection 421. Also, a 40 volts potential is applied to each of the relays 422 to 425.

At the lower end of each of the decades 412 to 415 there are terminals A and B, which are connected by wiring not shown to the lead and lag sliprings and brushes, respectively, of the associated decade. Since Figure 5 indicates a reading of 00.000, all four relays 422 to 425 have no current in their coils, and all are supplying current to the A terminals, i.e., the lead brushes corresponding to the lower half of the associated decade.

When, however, the thousandths decade moves into its upper half, the relay line R (411), at the lower left hand corner of the thousandths segments 411 is energized and the hundredths switching relay 422 is switched from the lead terminal A to the lag terminal B. Similarly, if the digit in the hundredths segment is any digit from 5 to 9, current is passed by way of the hundredths relay terminal R at the lower right hand of the hundredths segments 412 to the coil of the tenths switching relay 423, thereby switching said relay from energizing the lead brush 413$a$ by way of terminal A to energizing the lag brush 413$b$ by way of the lag terminal B. In the same manner, relay 424 is controlled by the signal from the R terminal at the lower right of the tenths segments 413 and the relay 425 for tens is controlled by the coil signal from the terminal R at the lower right of the units segments 414. Since there is no decade higher than tens, there is no R terminal at the lower right of the tenths segments 415.

Note that at the time that the thousandths brush assembly 411$a$ is turned to the segment 00.005, as in Figure 6, both lead and lag hundredths brushes 412$a$ and 412$b$ are on a hundredth segment. Thus, when the relay actuates, and the 40 volt potential is transferred from one hundredths brush to another, the same hundredths segment is energized for that moment of transfer. This action occurs in a similar manner for any two adjacent decades.

It will be seen that there are two switching actions of the brushes for each cycle of ten numbers of the previous decade. The direction of switching depends upon whether the numbers of the previous decade are going up or going down. In going up in numbers, the power is transferred from a leading brush to a lagging brush when the previous decade commutates from 4 to 5. As the number continues to increase, the power is again transferred, but in the reverse direction, from a lagging brush to a leading brush, when the previous decade commutates from 9 to 0.

Conversely, when the numbers are decreasing, the power is transferred from a lagging brush to a lead brush as the previous decade goes from 5 to 4, and is returned from the leading brush to the lagging brush as the previous decade goes from 0 to 9.

Figure 6 shows the current flow in the lead-lag switching relays 422 to 425 for the particular decimal number indicated, namely, X=94.825. The light lines are lines in open circuits, in which there is no current flowing. The heavy lines are lines in which current is flowing by virtue of the switching relays.

It will be seen from the foregoing that switching relays 422 to 425 provide the electrical equivalent of a Geneva movement. That is, when the number in one decade progresses from 9 to 0 so that the next higher decade should suddenly be shifted to an increase of one digit, the snap action increase is accomplished by the sudden deenergization of the coil and the switching relay associated with the higher of the two decades.

Of course, at some point after such an increase occurs, and before another decade change point is crossed, the switching relay must be reset. This resetting occurs at the change from digits 4 to 5, at which time shifting the relay has no effect on the signal issuing from the associated decade.

Each of the ten number-indicating segments in the five decade segment systems 411 to 415 has ten terminals, indicated generally for the segment system 411 by the number 411$e$ for the ten thousandths decade in Figure 6, for the ten hundredths digits by the number 412$e$, for the ten tenths digits by the number 413$e$, for the ten units digits by the number 414$e$, and for the ten tens digits in the segments 415 by the numeral 415$e$.

Dummy segments, with the letter $f$ added, are included in segments systems 411 to 415, because gaps in the segment path might cause undue wear to both brushes and segments.

Each segment of each decade is connected to a corresponding light in the X display columns 222 in console 200 (see Figure 1).

In addition, the ten segments of each decade are connected to a current-stepping circuit, described hereinafter in connection with Figure 7, so that a single output current from each decade indicates in ten approximately equal steps which digit between 0 and 9 corresponds, in each decade, to the instantaneous X-position for the table 120.

The five signals thus produced are transmitted by way of five line conductors 402 to the numerical comparison unit for comparison with the command being received by line 310 from the tape 305.

A feature of the printed or etched circuit board 410, which may be observed in Figures 5 and 6, is the special shaping of the segments so as to space at the greatest distance from each other each of the connection points 411e, etc. The profiles employed in the circuit board 410 provide the most favorable physical arrangement for soldering leads to the connection points at the back of the board.

Figure 7 is the equivalent of Figure 5, being an alternative species in which transistor circuits are used to perform the same functions as the relays 422 to 425 of Figure 5. Because of the equivalency in function, the said transistor circuits will be referred to herein as "transistor relays." They are designated in Figure 7 by the prime numbers 422′, 423′, 424′, and 425′. All four transistor relays are identical, and are illustrated schematically in Figure 7 by the rectangles bearing their identifying numerals. The construction of the transistor relays is shown in Figure 7a, which reveals the circuitry of the typical transistor relay 422′.

The same etched or printed segments 411 to 415 may be employed exactly as illustrated in Figures 5 and 6. For purposes of simplicity of drawing, Figure 7 does not repeat the illustration of the physical appearance of the segments, but merely illustrates them schematically by the small blocks 411 to 415. Similarly, the associated brushes, identified by the segment numeral plus $a$ for the leading brush, and $b$ for the lagging brush are illustrated merely by small rectangles at the terminals of the connection lines.

Also, as in the case of Figure 5, the brush 411a has a forty volt input through line 421, and a terminal R′ (411), equivalent to R (411) for energizing the hundredths lead-lag switching relay 422′ when the thousandths digit is 5, 6, 7, 8, or 9. The more significant decades are also provided with A′, B′, and R′ terminals which function exactly in the same manner as described in connection with the A, B, and R terminals of Figures 5 and 6. A current stepping circuit 470, preferably mounted on a readily removable and replaceable insulating board mounting, has nine plug connections 471 to the thousandths terminals 411e corresponding to the digits 1 to 9. No connection to the stepping circuits (to be described hereinafter) is necessary for the zero digit segment 411, except in the tens decade to be described hereinafter.

It will be seen that the plug connectors 471 also serve to connect the digits 1 to 9 to their corresponding lights in the display column 222, except that the zero segment of segments 411 is connected directly to the zero display light at 472.

A stepped current output of a current stepping circuit 470 leaves it by way of plug connection 473 and passes by way of line 474, which is one of five strands in the multiple conduit line 402, to the numerical comparison unit 500.

Each of the other decades is connected in an exactly similar manner, except that in the tens decade, only the zero and one digit are connected as shown, with no stepping current output for the nine digit. This arrangement is for the purpose of presenting a proper set of currents to the numerical comparison boards to produce an up-driving signal to the motor when the table position is negative, that is, in a region near zero but below zero. This position is possible if a positional command is zero and the table overshoots, or if the table were hand-cranked to a region below zero reference. Since no command below zero can be presented by the tape reader, and since the particular embodiment does not call for more than 19.999 inches, the tens command microswitches need only produce step currents for the digits of zero and one. For the tens decade only, a zero command produces a current and a one command produces a larger current. Thus, in comparing the command with the position, matching comparisons will be made with the digits one and zero, but if the position goes below zero, the tens decade produces no positional signal to counteract the command signal. The numerical comparison assembly receives a signal which, when interpreted by the assembly, causes upgoing drive to be applied to the motor. The current stepping circuit for the hundredths decade is identified by the numeral 480, and for the tenths decade by the numeral 470a, for the units decade by the numeral 480a. The current-stepping required in the tens decade is produced by step resistors in the same manner as the current-stepping in the current-stepping circuit 480, which will be described in connection with Figure 7c.

One special feature remains to be described in connection with Figure 7, before proceeding to a description of the transistor relay (Figure 7a), and the two types of current stepping circuits (Figures 7b and 7c). Whenever the movement of the table 120 along an X-axis exceeds a certain speed, provision is made for lifting the thousandths brushes 411a from the thousandths segments 411 and the hundredths brushes 412a from the hundredths segments 412, in order to prevent undue brush and segment wear at high speeds. This provision consists of a pair of relays, 431 and 432, which are actuated by a current which may be supplied from any part of the circuit indicating high speed in the X-direction, for example from the motor circuit to be described hereinafter in connection with Figure 12, or by any other means, of which there are many familiar to those skilled in the art, for producing an operating current when the velocity along the X-axis exceeds a certain predetermined limit. When the relay 431 is actuated, it lifts brushes 411a and 412a by a mechanical means indicated schematically by the dashed line 433. At the same time, the relay 432 short circuits the lead and lag brushes 413a and $b$, so that the absence of any lead-lag brush switching signal to transistor relay 423′ will not produce any hiatus in the energization of the tenths segment system 413.

The operation of the transistor relays 422′ to 425′, which switch energization back and forth between lead and lag brushes depending on the signal from the preceding decade, may be understood from the description of the circuit of transistor relay 422′, illustrated in Figure 7a.

The operation of the circuit illustrated in Figure 7a is such that the 40 volt positive potential supplied at 421a (so numbered to indicate that it may be the same 40 volt power supply as terminal 421) will be applied to the lead brush line A′ through a lead brush transistor 460A′ in the absence of any up-digit transfer signal at R′ (411). When, however, the next lower decade segments (thousandths segments 411 in the illustrative example) indicates a digit 5 to 9, a signal is transmitted by way of the line R′ (411), through a signal relay transistor 461, to shift the 40 volt potential of 421a from terminal A′ to terminal B′ by transferring the conducting function to the lagging brush transistor 460B′.

The operation of circuit 422′ requires a biasing potential source 462, which provides plus and minus 52 volts. In addition, the voltage-dividing resistors 463 to 468b are required for presenting the proper voltages to the transistor circuit. It will be noted that the lead and lag transistors 460A' and 460B' are of the PNP type, and the signal relay transistor 461 is of the NPN type. However, it will be apparent to those skilled in the art that other arrangements of transistors might be used to accomplish the desired result with modifications of the circuit shown.

The brush lines A' and B' are provided with blocking diodes 469a and 469b to prevent an unwanted feed-back when both brushes 412a and 412b happen to be moving over the same segment. Thus, if a signal were passing out through the leading brush line A' to leading brush 412a, and it was desired that lagging brush 412b be idle, it would be possible, when the two brushes were contacting the same segment, for the undesired feed-back of 40 volts to appear at the terminal B' (see Figure 7a) and disrupt the operation of the transistor switching circuit 422'.

In operation, when no signal is present at terminal R' (411), the voltage divider resistors 463 and 464 cause the base of the signal relay transistor 461 to be negative and transistor 461 is non-conductive. Because of the voltage divider action of resistors 465, 466b and 466c, the base of transistor 460B' becomes positive with respect to its emitter and thus becomes non-conductive. Because of the voltage divider action of resistors 466a, 467 and 468b, the base of transistor 460A' becomes negative with respect to its emitter and thus becomes conducting. A potential of 40 volts is then applied to the anode of diode 469a, passing through 469a to terminal A'. In this condition, the voltage divider action of resistors 466a, 467 and 468b maintain the collector of transistor 460B', slightly negative. Thus, the anode of diode 469b is slightly negative and no current flows to terminal B'.

This switching action can be seen to be essentially the same as was explained in previous discussion when relays were used. Switching for the tenths, units, and tens decades occurs in exactly the same manner as discussed above.

When a positive potential at R' (411) causes current to flow into base of transistor 461, the transistor becomes heavily conducting through resistor 466c and causes the base of transistor 460B' to become negative with respect to its emitter. Thus, the lagging brush transistor 460B' is put into a highly conductive condition. The 40 volt terminal 421a then sends a current through transistor 460B', through diode 469b to the lagging brush terminal B'. At the same time, the base potential of transistor 460A' is driven positive because of the voltage divider action of resistors 466a and 467. Thus transistor 460A' becomes non-conductive. A negative 52 volts is applied to the collector of transistor 460A' and the cathode of diode 469c through resistor 468a. Diode 469c prevents the collector of transistor 460A' from becoming appreciably negative. The anode of diode 469a is essentially at ground potential and no current flows to terminal A'.

In Figure 7b, a circuit 470 diagram for stepping-circuit reveals the manner in which the current applied to a particular segment of segments 411 produces at output terminal 474 a current proportional to the digit of the segment.

The principal parts of the circuit 470 are eight stepping resistors 475.1 to 475.8 disposed in series at the lower end of lines 1 to 9 for the digits of the decade, each of said lines containing a blocking diode 476.1 to 476.9 respectively, to prevent undersired leakage of current backward in circuit (i.e. from resistors 475.1 to 475.8 to display lights 222). The resistors 477.1 to 477.9, paralleling the diodes 476.1 to 476.9 respectively, are merely high resistance leakage resistors provided to ground small backward current leakages which might occur through diodes 476.1 to 476.9 because of imperfections in their rectifying operation. The small residual leakage produced by diodes 476.1 to 476.9, is compensated, to a substantial degree, by reverse leakage of diode 479, in the overall resultant effect upon the step currents obtained at output signal line 474. Resistors 477.5 through 477.9 have the additional function of carrying switching current; thus, when voltage is applied to any of the diodes 476.5 through 476.9, a current will flow to the R' terminal to actuate the switching relay of the next higher decade (422' in this case).

Resistors 475.1 to 475.9 are selected so that as voltage is successively applied to each resistor in turn, the total of the output currents which flow to line 474 will be direction proportional to the number represented by the energized segment.

The series resistor arrangement is used for the thousandths decade and is necessary because the single brush 411a (necessary to the proper operation of this system) short circuits two adjacent segments in passing. It is necessary to produce a step current from only one segment even though two segments may be contacted. For example, when thousandths brush 411a is contacting segments 8 and 9, plus 40 volts is applied to diodes 476.8 and 476.9, but current flows only through 476.9. Stepping resistors 475.1 through 475.8 all rise to the plus 40 volt potential because there is substantially no current flow through diodes 476.1 to 476.8. No current flows through stepping resistors since diodes 476.1 through 476.7 are non-conductive for this polarity. Diode 476.8 is non-conductive even though plus 40 volts is applied to segment 8 because a plus 40 volt potential appears at the cathode (i.e. downstream) end.

The circuit 470 is duplicated in the circuit of 470a for the production of the tenths stepped current.

The hundredths (and units and tens) in the present embodiment do not require the diodes 476.1 to 476.9, nor their associated leakage resistors, nor leakage diode 479, vecause these decades do not use a single shorting brush like 411a, but two separate brushes 412a and 412b. It will be noted that the Figure 7b type of stepping circuit is required for the tenths decade because the tenths brushes 413a and 413b are shorted to function as a single brush, by relay 432, when the high speed brush-lifting system 433 is in operation.

Consequently, the simple resistance stepping circuits 480 and 480a, illustrated in Figure 7c, are used for the hundredths, units, and tens decades to produce a current which is approximately proportional to the digit for the decade.

The stepping resistors 485.1 to 485.9 diminish in one tenth steps to produce a stepped current signal at the output line 484 (seen at the bottom of circuit 480 in Figure 7b). Since no part of the output line ever rises more than a fraction of a volt above ground, there is no significant current to the hundredths signal lights 222.

As in all the decades, except the most significant, the 5 to 9 digits are connected to an R' terminal, through resistances 487.5 to 487.9, to actuate the transistor switching relay of the next higher decade (423' in this case).

NUMERICAL COMPARISON UNIT—X-POSITION

Only the X-position portion of the numerical comparison unit 500 will be described, since the Y-position portion of the unit is identical.

The numerical comparison unit 500 has no moving parts but is comprised of a set of six circuit boards, four of which are identical. The circuit board for the most significant digit of the X-position (the "tens" digit in the present embodiment) is identified generally by the numeral 503 in Figure 8. The circuit boards for the units, tenths, hundredths, and thousandths digits of the X-position are all of the type indicated generally by the numeral 505 and illustrated in Figure 9. The sixth board, indicated generally by the numeral 508 in Figure 10, is a motor and brake relay driver, which receives the net switching conditions of the five numerical comparison boards, which are indicated diagrammatically in Figure 11 by boxes, each containing the digits to which the respective board refers. The numerical comparison boards are identified by the numerals 503 for the tens, 505 for the units, 505a for the tenths, 505b for the hundredths, and 505c for the thousandths.

Each of the six boards has a number of terminals indicated by capital letters, eight terminals for the tens board of Figure 8, 12 terminals for the 505 boards, as illustrated in Figure 9, and nine terminals for the relay driver board 508 of Figure 10.

In all six boards, the A terminal is connected to a positive power supply, plus six volts, the B terminal is connected to a negative power supply, minus six volts, and the C terminal is ground. (It will be appreciated by those skilled in the art that other potentials might be used if required by particular components.)

In the five digit boards, 503 and 505 to 505c, each D terminal receives a current signal derived in both polarity and magnitude from the difference between a commanded number and a positional number for the particular decade. These signals are referred to as error signals.

The board 503, being for the most significant digit, receives as a driving signal only the tens difference, if any, between the commanded number and the positional number; this signal is received at an input at terminal 503D. However, each of the less significant digits receives an overriding signal from the board for the next higher digit. The overriding signal will be referred to herein as the EHLM signal, because of the capital letters identifying the terminals from which it is derived.

The interconnection between the six numerical comparison unit boards is illustrated diagrammatically in Figure 11. The tens board 503 receives a tens error signal over the terminal 503D and transmits this signal over the line 503EHLM to the units board 505. The conduit 503EHLM is shown in heavy line because it contains four conductors, one for each of the four terminals E, H, L, and M respectively.

In its turn, the units board 505 receives both the overriding signal from conduit 503EHLM, and units input signal 505D. These two signals are combined to pass on down a second overriding signal to the tenths board 505a by way of an overriding signal conduit 505EHLM.

In a similar manner, each of the three least significant digits receives both an error signal over its D terminal and an overriding signal at its EHLM terminals.

Finally, a summary signal is delivered from the thousandths board 505c by way of a two line conduit 505cEM to the relay driver board 508.

The relay driver 508, in its turn, delivers a set of four signals over its output terminals 508D, 508E, 508L, and 508M, to the motor and brake control system for the X-position, as will be discussed hereinafter in connection with the description of Figure 12.

The terminal interconnections for the six boards of the numerical comparison unit 500 are summarized in the following table.

*Common connections*

A = plus 6 volts
B = minus 6 volts
C = ground

D terminal on each of the five numerical comparison boards receives a current which indicates by its magnitude the difference between the particular digit in the command number and the digit in the positional number, and by its polarity whether the error is positive or negative.

*From tens to units*

E is connected to J
H is connected to G
L is connected to F
M is connected to K

*From units to tenths*

E is connected to J
H is connected to G
L is connected to F
M is connected to K

*From tenths to hundredths*

E is connected to J
H is connected to G
L is connected to F
M is connected to K

*From hundredths to thousandths*

E is connected to J
H is connected to G
L is connected to F
M is connected to K

*From thousandths to the relay driver*

E is connected to G
M is connected to K

From the relay driver to the motor and brake control system of Figure 12, M and D are connected to the motor brake relay.

L and E are connected to the right and left hand directional relays of the motor armature control, respectively.

The manner in which the tens error signal produces an output signal from the tens comparison board 503 may be understood from the following description of the circuit in Figure 8. The circuit of 503 is seen to be symmetrical about the input line 530 from the input terminal D. Disposed above the input line 530 are two odd numbered NPN transistors, 531 and 533, which transmit a positive signal to terminal E when D is positive. Disposed below the input line 530 are two even numbered PNP transistors, 532 and 534, which transmit a negative signal to terminal M through line 536 when D is negative.

The operation of the circuit and the function of the remaining components may be understood from the following description of the three modes of operation of the circuit of tens board 503:

(a) Zero signal at terminal D, i.e. for the tens decade, the commanded digit and the X-position digit are the same.

Transistor 531 will cut off due to the bias voltage developed from the combination of the resistor 531b and diode 541. Transistor 532 is cutoff because of the bias developed by the combination of resistor 532a and diode 542. The transistor 533 is driven to saturation because of the voltage divider action of the three resistors 531a, 531c and 533b. The transistor 534 is driven to saturation because of the voltage divider action of the resistors 532b, 532c and 534a.

Thus, for a zero driving signal, the potentials at the output terminals of board 503 will be as follows:

E _____ Substantially ground.
M _____ Do.
H _____ Plus.
L _____ Minus.

(b) A negative driving signal at terminal D, i.e. the command signal exceeds the positional signal of the tens decade.

If the negative driving signal is applied to terminal D of board 503, transistor 532 is driven to conduction through diode 545, causing the collector of 532 to approach ground potential. Because of the voltage divider action of resistor 532c, and 534a, transistor 534 is biased to cutoff and terminal M now goes to a negative potential. Since terminal L is connected to the collector of transistor 532, its potential is near 0. The conditions of transistors 531 and 533 together with their respective outputs remain unchanged.

(c) A positive error signal terminal D, i.e. the X-position of the table is greater for the tens decade than the command position.

If a positive driving signal is fed to terminal D, transistor 531 is driven and transistor 533 becomes cut-off in the same manner as occurred for transistors 532 and 533 when a negative driving signal was applied. Therefore, for a positive driving signal into terminal D, terminals M and L will be at the same potentials as for 0 driving, but terminal E will become positive and terminal H will be near 0.

Figure 9 appears very much like Figure 8, except that there is an additional transistor sub-circuit at the upper part of the transistor board 505.

(a) Assume that there is no polarity signal to terminal D of board 503 or terminal D of board 505. Since E and M of board 503 are near ground potential, no current flows to terminals J and K of board 505 and no driving signals are fed to transistors 551 or 552. Therefore, the potentials of terminals E, H, L and M of board 505 are the same as they were in the previous discussion of board 503 in condition (a), zero signal.

The positive voltage from terminal H of board 503 to terminal G of board 505, through the voltage divider action of resistors 562a and 562b, causes transistor 562 to become biased off (non-conductive).

The negative voltage from terminal L of board 503 to terminal F of board 505, through the voltage divider action of resistors 563a and 563b causes transistor 563 to become non-conductive. Thus, for the no signal condition of board 503, transistors 562 and 563 are inoperative.

If then a polarity signal is fed to terminal D of board 505, voltage changes will appear at the output terminals of board 505 in the same manner as previously described for board 503.

(b) Assume that a positive polarity signal is fed to terminal D of board 503 but a negative polarity signal is fed to terminal D of board 505.

In our numerical comparison system that board which is receiving a polarity signal and which is in the most significant position must override any polarity signals being delivered to any of the comparison boards in a lesser significant position. This is the assumption given above, in that the positive polarity fed to board 503 must override the negative polarity being fed to board 505. This is accomplished in the following manner: the positive current flowing into terminal D of board 503 passes through diode 543 to cause transistor 531 to conduct, and terminal H then falls to near ground potential. Terminal H is connected to terminal G of board 505 and, through the voltage divider action of resistors 562a and 562b, the base of transistor 562 is driven negative and becomes conducting.

The negative driving signal being fed into terminal D of board 505 then flows through transistor 562 to ground, and does not cause switching of transistor 552, which it might do if transistor 562 were not present or operating.

We have now prevented the negative polarity signal from the lesser significant decade from causing output switching but it is still necessary to cause board 505 to assume the same switching condition as board 503. Board 503, when it received the positive driving signal at its terminal D, produced a positive output at terminal E.

Since terminal E is connected to terminal J of board 505, this positive voltage causes current to flow through resistor 551d, driving transistor 551 into conduction in the same manner as if a positive signal had been fed into terminal D. Thus, the output terminals of board 505 assume the same conditions as board 503 and board 505 has been forced to polarize in sympathy with board 503.

(c) If now the positive driving signal to board 503 is removed (by the digit of the tens command being equal to the digit of the tens position), it is desired that board 505 assume those conditions associated with the negative polarity signal into terminal D of 505. This occurs in the following manner: When terminal D of board 503 loses its driving signal, transistor 531 assumes a cutoff condition causing output terminal H to rise to a positive voltage, terminal H of board 503 is connected to terminal G of board 505, and through the voltage divider action of resistor 562a and 562b, cause transistor 562 to become non-conducting.

Thus the negative driving signal into terminal D of board 505 is no longer clamped to ground by transistor 562 and is able to drive transistor 552 in the normal manner. At the same time, terminal E of board 503 (connected to J of board 505) goes back to the potential near ground, and thus removes the positive driving signal from transistor 551.

The logic described above for two decades can be extrapolated to as many decades as desired. It is obvious that a continuation of interconnections between boards will always cause the final board (the least significant decade) to assume the same output conditions as the initial board which is receiving a polarity signal on the terminal D.

OPERATION OF RELAY DRIVER

The principal components of the circuit of board 508, diagrammatically illustrated in Figure 10, are three PNP transistors 581, 582, and 583. Transistors 581 and 582 may be referred to as the right and left drive transistors, respectively, since they deliver the signal which produces either right increasing or left decreasing drive of the X-position motor 601. The transistor 583 may be referred to as the inverter transistor since it inverts the positive polarity signal coming in on line 585 into a negative driving signal for transistor 582. At the same time, transistor 583 feeds a signal to terminal 508D, connected to brake relay coil 6/0 in Figure 12. The operation of relay 670 will be described hereinafter. It will be noted that the M terminal of board 508 is merely a connection to the K terminal, and therefore transmits to the brake coil 670 the same signal which is received at the input terminal K.

Each of the three transistors 581 to 533 has associated voltage-dividing resistances. With the right drive transistor 581, resistors 581a and 581b are associated; with the left drive transitor 582, resistors 582a and 582b are associated; and with the brake transistor 583, resistors 583a, 583b and 583c are associated.

Input signals at terminals K and G enter the circuit through lines 584 and 585. A right drive signal leaves the circuit board 508 by way of line 586 and terminal L, a left drive signal by way of line 587 and terminal E, and a brake signal by way of line 588 and terminal D, and line 584 and terminal M.

The operation of the circuit of Figure 10 may be considered in two parts, first the right and left motor drive, and secondly the brake signal operation, as follows:

(a) RIGHT AND LEFT MOTOR DRIVE

In the previous discussion of the operation of the numerical comparison boards 503 and 505 to 505c, it was shown that the output of the least significant decade board (505c) assumes the condition of the most significant decade which has a polarity drive at its terminal D, thus producing directional control. The output of the last board 505c is fed into the directional relay board over line 505cEM. The two directional control relays 621 and 622, to be described hereinafter, are connected between a source of negative 52 volts at C24 in Figure 12, and the terminals E and L of board 508.

It will be understood that there are three possible states of the board 508:

(1) A negative polarity signal applied at K, G being at ground, the distribution of voltages produced by the voltage-dividing resistors 581a and 581b will right drive transistor 581 to pass a right drive (decreasing value of X) signal through line 586, no signal being passed by the left drive transistor 582, or the inverter transistor 583.

(2) A positive polarity signal at G, K being at ground, the voltage dividing action of resistors 583a and 583b will cause transistor 583 to become cut off, permitting negative voltage to appear on line 588, and also driving, through resistor 582b, transistor 582, which passes a left, or X-increasing signal through line 587. No signal will be passed by the right drive transistor 581.

(3) If both input terminals K and G indicate ground, or they approach ground, as the numerical comparison unit 500 indicates that the position of the table X is at or very nearly approaching the command position, the voltage-divider action of resistors 583a and 583b cause transistor 583 to become conducting, removing the drive to transistor 582 and thus removing the signal from "left" line 587. At the same time, there is no drive to transistor 581 and no right signal appears at line 588.

A sensitive relay 670 is connected in series with a capacitor 671 across terminals M and D of board 508 as shown in Figure 12. For a positive polarity signal terminal K of board 508 is near ground potential, but, as was mentioned before, the collector of transistor 583 is at a negative potential. Assume that the error signal from the numerical comparison boards 503—505c has approached zero from a positive direction, and current has passed through the sensitive relay 670 into the capacitor 671 until the capacitor has received full charge and the current through the relay has decayed to 0. If now the polarity output of the comparison assembly 503—505c becomes 0 (converter numerals equal to command numerals) transistor 583 suddenly becomes conducting, bringing terminal D of board 508 to near ground potential. The capacitor 671 then discharges through the relay 670, closing its contacts for a short time. The contacts of relay 670 are connected between the brake power 680 and the brake 611. Therefore the brake is energized for a short time, in this system sufficient time to bring the motor and drive to a complete stop. If the table overshoots the desired position, negative polarity signal to board 508 coming in on terminal K will cause terminal M (one side of capacitor 671) to become negative at the time that terminal D approaches 0, and a current will flow from the capacitor 671 through the relay 670 in the same manner as described above.

When the directional motor relays 621 and 622 are both de-energized, separate brake current circuit 623 is completed through their contacts connected in series, so that after the short time braking impulse from the sensitive brake relay has disappeared, the brake current is held on. The brake will stay on until either of the directional relays is energized.

MOTOR AND BRAKE CONTROL X-POSITION

The circuit diagram of Figure 12 illustrates the relay system by means of which the driver signals from the relay driver are used to control the X-position motor 601.

The motor 601 is indicated by its armature 610, brake coil 611, and field winding 612. The armature 610 can be caused to rotate in either a right or left direction, depending on the polarity of the applied voltage, and either at a high or low speed, depending on whether 115 volts direct current or 30 volts direct current is applied to the armature brushes 613 by way of lines 614 and 615.

A pair of direction control relays 621 and 622, for right and left respectively, which receive a right or left command from the relay driver 508 by way of lines 508L or 508E respectively, and then cause the operation of a right or left power relay 631 or 632, respectively, to supply either 115 volts high speed power from line 640 or 30 volts low speed power through line 641, as determined by the position of the speed change relay 650, the operation of which will be described hereinafter.

The brake 611 is operated by brake input signals delivered at 508M and 508D from the relay driver 508. The brake is applied regardless of the polarity of the brake signal, the relay switch 670 being a double-throw switch which supplies minus 125 volts operating power from power line 680 to the brake 611. A capacitor 671 is provided in the brake relay 670 so that the brake relay is automatically de-energized and braking is discontinued after the lapse of a period of time predetermined by the capacity of capacitor 671. This period of time is selected to produce the desired period of braking following a zero signal of either the false zero or final zero type.

The table-limit switching system 700 is merely a safety device introduced into the circuit between the direction relays 621 and 622 and the power relays 631 and 632 to disconnect power from the armature 610 whenever the table, indicated in Figure 12 by the block 120, trips the right or left table-limit switches 701 and 702 respectively, by reaching the limit of permitted table movement. Simultaneously, the brake is applied by power supplied through line 703.

Whenever a command has been completed, and a new command is supplied to the numerical comparison unit 500, the speed-change relay 650 is opened to an up-position as illustrated in Figure 12, which operates the brush lifting solenoid 433 in converter 400 and brush shorting relay 432 by way of line 434, removes the power to the bottom two digits of the command assembly by way of 360a, and drives the motor armature 610 at high speed (plus 115 volts D.C. by way of line 640). However, the instant the first braking signal is transmitted to the system by way of terminals 508D and 508M, the speed-change relay 650 is actuated, and remains thereafter fully actuated until the current command is completed and a new command has been given. Although energized, it does not drop to the lower position at once. Preferably, for smoothness of operation, there is a delay of a fraction of a second before it falls to the lower speed position. Hence, it is referred to as a time-delay relay.

However, once in the lower position, it dispatches signals by way of lines 434 and 360a to drop the converter brush lifter 433, open relay 432 and energize the two least significant digits of the command by way of line 360a, respectively.

Once in this position, the speed-change relay 650 must remain in the slow speed position for the entire remainder of the particular command; it is, therefore, a latching relay as well as a time-delay relay. When the command is completed, the speed change relay 650 is not only de-energized but unlatched, and springs back to the upper or high speed position, as illustrated in Figure 12, thus restoring high speed 125 volt power to motor armature 610, and blocking out the least significant digits by energizing the brush lifting device 433 already described.

The foregoing description and the accompanying drawings have disclosed one specific embodiment of the invention, but it is evident that modifications of design and construction will be apparent to those skilled in the art. For example, improvements in transistors may eliminate the need for some of the resistors shown. Also, some components including transistors, may be replaced by equivalent devices or circuits without departing from the scope of the combinations which are claimed. Consequently, we do not wish to be limited to the details illustrated and described herein, but rather to the scope of the appended claims, which define the invention generically and specifically with sufficient breadth to include many changes in construction, modifications in circuitry, and selection, proportion, and arrangement of parts, with-

We claim:

1. A position-indicating system for producing a numerical signal corresponding to a shaft position, which system includes: a series of circular segment systems, one system for each digit of said numerical signal, and each of said segment systems including a separately electrically conductive segment for each value of the digit of said system; a leading brush and a leading brush slip ring means associated with at least the more significant digit circular segment systems, said leading brush being adapted to sweep around said circular segment system and to make electrical contact between successive segments in said system and said leading brush slip ring means; a lagging brush and a lagging brush slip ring means associated with each of said segment systems having a leading brush, said lagging brush being adapted to sweep around said circular segment system at least one segment behind said leading brush, and to make electrical contact between successive segments in said system and said lagging brush slip ring means; position means for rotating the leading and lagging brushes for the segment system corresponding to the least significant digit of said numerical signal; a series of rotating means for each successively more significant digit of said numerical signal, each of said rotating means being related to the rotations of said least significant digit rotating means to reduce the number of rotations in proportion to the relationship of the digits, and each of said rotating means rotating one of said leading and lagging brush systems associated with one of said segment systems; a current-stepping circuit associated with each of said segment systems, said circuit including a connection to each of said segments in said system, an output connection, and a series of impedance means in said circuit adapted to produce an output current at said output line corresponding to the value for the digit of the particular segment contacted in the associated segment system; brush switching means associated with each of said sets of leading and lagging brushes and adapted to selectively energize either of said brushes; and means for operating said brush switching means for a particular segment system when certain segments in the segment system of the next less significant digit are energized.

2. A position-indicating system for producing a numerical signal corresponding to a shaft position, which system includes: a pair of concentric circular segment systems, an outer system for a less significant digit of said numerical signal, and an inner system for a more significant digit, each a separate electrically conductive segment for each value of the digit of said system; a leading brush and a leading brush slip ring means associated with said inner circular segment system, said leading brush being adapted to sweep around said inner system placing each of said segments in turn in electrical communication with said leading brush slip ring means; a lagging brush and a lagging brush slip ring means associated with said inner circular segment systems, said lagging brush being adapted to sweep over said inner system one segment behind said leading brush to make electrical contact between successive segments in said system and said lagging brush slip ring means; an outer brush assembly and outer brush slip ring, said outer brush assembly having interconnected contacts spaced around said outer segment system, said contacts being equal in number to the possible values of the digit of said outer segment system, and adapted to electrically connect said outer brush slip ring to at least one of said outer segments through at least one said outer brush contacts to repeat the count of all said outer segments once for each inner segment; position means for rotating all of said brushes around the common axis of said segment system and said slip rings; a current-stepping circuit associated with each of said segment systems, said circuit including a connection to each of said segments in said system, an output connection, and a series of impedance means in said circuit adapted to produce an output current at said output line corresponding to the value for the digit of the particular segment contacted in the associated segment system; brush switching means associated with said leading and lagging brushes and adapted to selectively energize either of said brushes; and means for operating said brush switching means for a particular segment system when a certain segment in the outer segment system is energized.

3. A decimal position-indicating system for producing a numerical signal corresponding to a shaft position, which system includes: a series of circular segment systems, one system for each digit of said numerical signal, and each of said segment systems including ten separate electrically conductive segments; a leading brush and a leading brush slip ring means associated with at least the more significant digit segment systems, said leading brush being adapted to sweep around said circular segment system and to make electrical contact between successive segments in said system and said leading brush slip ring means; a lagging brush and a lagging brush slip ring means associated with each of said segment systems having a leading brush, said lagging brush being adapted to sweep around said circular segment system at least one segment behind said leading brush, and to make electrical contact between successive segments in said system and said lagging brush slip ring means; a gear train and shaft system for rotating the leading and lagging brushes for each segment system at a rate corresponding to the significance of the digit which it is to indicate; a current-stepping circuit associated with each of said segment systems, said circuit including a connection to each of said segments in said system, an output connection, and a series of impedance means in said circuit adapted to produce an output current at said output line corresponding to the value for the digit of the particular segment contacted in the associated segment system; brush switching means associated with each of said sets of leading and lagging brushes and adapted to transfer current between leading to lagging brushes between one and nine values for the segment system of the next less significant digit; and means for operating said brush switching means for a particular segment system when segments in the segment system of the next less significant digit are energized.

4. A position-indicating system as described in claim 3 which includes: means responsive to the speed of said gear train and shaft system, said means being adapted to retract the brushes from the segment systems corresponding to the least significant digits whenever the speed of said gear train and shaft system exceeds a predetermined value.

5. A position-indicating system as described in claim 3 in which said brush-switching means is an electronic circuit including at least two transistors in parallel, one for each of the brushes controlled, and power is passed through one of said transistors selectively to the desired brush depending upon changes in the transistor biasing condition produced by a signal from the segments of the segment system of the next less significant digit.

6. A numerical comparison system which includes: an input shaft means adapted to be rotated to indicate by its position any value within a range of a predetermined numerical signal; a series of circular segment systems, one system for each digit of said numerical signal, and each of said segment systems including a separate electrically conductive segment for each value of the digit of said system; a leading brush and a leading brush slip ring means associated with each of said circular segment systems, said leading brush being adapted to sweep around said circular segment system placing each of said segments in turn in electrical communication with said leading brush slip ring means; a lagging brush and a lagging brush slip ring means associated with at least the more significant of said circular segment systems, said lagging brush being adapted to sweep over said circular segment system at least one segment behind said leading brush, and to make electrical contact between successive segments in said system and said lagging brush slip ring means; position means for rotating the leading and lagging brushes for the segment system corresponding to the least significant digit of said numerical signal; a series of rotating means for each successively more significant digit of said numerical signal, each of said rotating means being related to the rotations of said least significant digit rotating means to reduce the number of rotations in proportion to the relationship of the digits, and each of said rotating means rotating one of said leading and lagging brush systems associated with one of said segment systems; a current-stepping circuit associated with each of said segment systems, said circuit including a connection to each of said segments in said system, an output connection, and a series of impedance means in said circuit adapted to produce an output current at said output line corresponding to the value for the digit of the particular segment contacted in the associated segment system; brush switching means associated with each of said sets of leading and lagging brushes and adapted to selectively energize either of said brushes; means for operating said brush switching means for a particular segment system when certain segments in the segment system of the next less significant digits are energized; a second source of current signals, one current for each digit of said numercial signal, and each of said currents corresponding in stepped value to a digit of a numerical signal; a null junction circuit for each digit of said two numerical signals, each of said circuits having a null junction to which the stepped currents for a particular digit from both of said numerical signals is conducted, and a pair of current-valving means disposed on opposite sides of said null junction for producing an output signal corresponding in sign and amount to the error difference between said two stepped currents; and electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero.

7. A numerical comparison system which includes: an input shaft means adapted to be rotated to indicate by its position any value within a range of a predetermined numerical signal; a series of circular segment systems, ten segments for each digit of said numerical signal, and each of said segment systems including a separately electrically conductive segment for each value of the digit of said system; a leading brush and a leading brush slip ring means associated with each of said circular segment systems, said leading brush being adapted to sweep around said circular segment system placing each of said segments in turn in electrical communication with said leading brush slip ring means; a lagging brush and a lagging brush slip ring means associated with each of said circular segment systems, said lagging brush being adapted to sweep over said circular segment system at least one segment behind said leading brush, and to make electrical contact between successive segments in said system and said lagging brush slip ring means; a gear and shaft system for driving said brushes in response to the rotation of said input shaft, each brush-driving shaft in said system being geared at a ten to one relationship with the brush-driving shaft of the next less significant digit; a current-stepping circuit associated with each of said segment systems, said circuit including a connection to each of said segments in said system, an output connection, and a series of impedance means in said circuit adapted to produce an output current at said output line corresponding to the value for the digit of the particular segment contacted in the associated segment system; brush switching means associated with each of said sets of leading and lagging brushes and adapted to selectively energize either of said brushes; means for operating said brush switching means for a particular segment system when the energized brush in the segment system of the next less significant digit passes from five to six; a second source of current signals, one current for each digit of said numerical signal, and each of said currents corresponding in stepped value to a digit of a numerical signal; a null junction circuit for each digit of said two numerical signals, each of said circuits having a null junction to which the stepped currents for a particular digit from both of said numerical signals is conducted, and a pair of current-valving means disposed on opposite sides of said null junction for producing an output signal corresponding in sign and amount to the error difference between said two stepped currents; and electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero.

8. A numerical comparison system which includes: an input shaft means adapted to be rotated to indicate by its position any value within a range of a predetermined numerical signal; an etched panel commutator board having a segment surface with a series of circular segment systems, one system for each digit of said numerical signal, and each of said segment systems including a separately electrically conductive segment for each value of the digit of said system; an enlarged radial connection part extending radially from each of said digit segments; an electrically isolated brush transfer segment between adjacent digit segments; a leading brush and a leading brush slip ring means associated with each of said circular segment systems, said leading brush being adapted to sweep over said digit and brush transfer segments placing each of said digit segments in turn in electrical communication with said leading brush slip ring means; a lagging brush and a lagging brush slip ring means associated with each of said circular segment systems except that for the least significant digit, said lagging brush being adapted to sweep over said digit segments at least one digit segment behind said leading brush, to make electrical contact between successive digit segments in said system and said lagging brush slip ring means; a gear and shaft system for driving all of said brushes in response to the relation of said input shaft, each brush-driving shaft in said system being geared to rotate at a proportionally lower rate corresponding to the significance of its associated digit; a current-stepping circuit associated with each of said segment systems, said circuit including a connection to each of said segments in said system, an output connection, and a series of impedance means in said circuit adapted to produce an output current at said output line corresponding to the value for the digit of the particular segment contacted in the associated segment system; brush switching means associated with each of said sets of leading and lagging brushes and adapted to selectively energize either of said brushes; means for operating said brush switching means for a particular segment system when certain segments in the segment system of the next less significant digits are energized; a second source of current signals, one current for each digit of said numerical signal, and each of said currents corresponding in stepped value to a digit of a numerical signal; a null junction circuit for each digit of said two numerical signals, each of said circuits having a null junction to which the stepped currents for a particular digit from both of said numerical signals is conducted, and a pair of current-valving means disposed on opposite sides of said null junction for producing an output signal corresponding in sign and amount to the error difference between said two stepped currents; and electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero.

9. A numerical comparison system as described in claim 8, in which the segment systems for the two least significant digits are concentric, and there are three slip rings concentric with said two concentric segment systems, one of said slip rings being associated with a single brush assembly for the least significant digit segments, and said brush assembly having ten contacts uniformly distributed around the least significant digit segment system, and the digit segments of said least significant digit segment system are spaced from one another so that each digit segment is contacted by one of said least significant digit brush contacts once during a single rotation of said least significant digit brush assembly.

10. A numerical comparison system as described in claim 8 in which at least some of said current-stepping circuits are identical and interchangeable, and mounted upon circuit boards adapted to be slidably connected to contacts with said circular segment systems, and at least some of said null junction circuits are identical and interchangeable and mounted upon circuit boards adapted to be merely connected or disconnected to the output of said current-stepping circuits and said second source of numerical current signals.

11. An automatic positioning system which includes: a command source for producing a numerical command signal consisting of a stepped-current signal for each digit of the numerical command signal; a rotating mechanism corresponding to position and having a rotational output shaft for each digit in a number corresponding to said position; a series of circular segment systems, one system for each digit of said numerical signal, and each of said segment systems including a separately electrically conductive segment for each value of the digit of said system; a leading brush and a leading brush slip ring means associated with each of said digit shafts, said leading brush being adapted to sweep around said circular segment system placing each of said segments in turn in electrical communication with said leading brush slip ring means; a lagging brush and a lagging brush slip ring means associated with each of said digit shafts, said lagging brush being adapted to sweep over said circular segment system at least one segment behind said leading brush, and to make electrical contact between successive segments in said system and said lagging brush slip ring means; a current-stepping circuit associated with each of said segment systems, said circuit including a connection to each of said segments in said system, an output connection, and a series of impedence means in said circuit adapted to produce an output current at said output line as a position signal corresponding to the value for the digit of the particular segment contacted in the associated segment system; brush switching means associated with each of said sets of leading and lagging brushes and adapted to selectively energize either of said brushes; means for operating said brush switching means for a particular segment system when segments in the segment system of the next less significant digit are energized; a null junction circuit for each digit of said command and position signals, each of said circuits having a null junction to which the stepped currents for a particular digit from both of said numerical signals is conducted, and a pair of current-valving means disposed on opposite sides of said null junction for producing an output signal corresponding in sign and amount to the error difference between said two stepped currents; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; reversible motor means for altering said position; relay means for driving said motor means in either of its directions in response to the error signal produced by said null junction circuits; brake means for braking said motor means when said error signal from said null junction circuits is in the vicinity of zero; and relay means associated with said motor driving relay to energize and lock said brake when neither of said motor driving relays is receiving a driving signal.

12. An automatic positioning system for positioning a movable platform in a position location of at least two coordinates, which positioning system includes: a memory means and an associated reading means, said memory means having a record of a series of platform positions and being adapted to be advanced through said reading means in a reading direction in a step-wise manner, and having all the data for one platform position in a one-step area transverse to said reading direction, and adapted to be read simultaneously by said reading means to produce two sets of stepped-current command signals, one set for each coordinate, and each set containing a current corresponding to the value of each digit of said coordinate value; positioning motors for said platform, one for each of said coordinates; a rotational system for transmitting the rotation of said motor to a series of digit shafts, one for each digit of the value of each of said coordinates; a series of circular segment systems, one system for each digit of said numerical signal, and each of said segment systems including a separately electrically conductive segment for each value of the digit of said system; a leading brush and a leading brush slip ring means associated with each of said digit shafts, said leading brush being adapted to sweep around said circular segment system placing each of said segments in turn in electrical communication with said leading brush slip ring means; a lagging brush and a lagging brush slip ring means associated with each of said digit shafts, said lagging brush being adapted to sweep over said circular segment system at least one segment behind said leading brush, and to make electrical contact between successive segments in said system and said lagging brush slip ring means; a current-stepping circuit associated with each of said segment systems, said circuit including a connection to each of said segments in said system, an output connection, and a series of impedance means in said circuit adapted to produce an output current at said output line as a position signal corresponding to the value for the digit of the particular segment contacted in the associated segment system; brush switching means associated with each of said sets of leading and lagging brushes and adapted to selectively energize either of said brushes; means for operating said brush switching means for a particular segment system when certain segments in the segment system of the next less significant digit are energized; a null junction circuit for each digit of said command and position signals, each of said circuits having a null junction to which the stepped currents for a particular digit from both of said numerical signals is conducted, and a pair of current-valving means disposed on opposite sides of said null junction for producing an output signal corresponding in sign and amount to the error difference between said two stepped currents; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; relay means for driving said positioning motors in response to the error signal produced by said null junction circuits; brake means for braking said motor means when said error signal from said null junction circuits is in the vicinity of zero; and relay means actuated when the error difference between command and position signals for both of said coordinates is indicated to be zero.

13. An automatic positioning system which includes: a command source for producing a numerical command signal consisting of a stepped-current signal for each digit of the numerical command signal; a rotating mechanism corresponding to position and having a rotational output digit shaft for each digit in a number corresponding to said position; a series of circular segment systems, one system for each digit of said numerical signal, and each of said segment systems including a separately electrically conductive segment for each value of the digit of said system; a leading brush and a leading brush slip ring means associated with each of said digit shafts, said leading brush being adapted to sweep around said circular segment system placing each of said segments in turn in electrical communication with said leading brush slip ring means; a lagging brush and a lagging brush slip ring means associated with each of said digit shafts, said lagging brush being adapted to sweep over said circular segment system at least one segment behind said leading brush, and to make electrical contact between successive segments in said system and said lagging brush slip ring mean; a current-stepping circuit associated with each of said segment systems, said circuit including a connection to each of aid segments in said system, an output connection, and a series of impedance means in said circuit adapted to produce an output current at said output line as a position signal corresponding to the value for the digit of the particular segment contacted in the associated segment system; brush switching means associated with each of said sets of leading and lagging brushes and adapted to selectively energize either of said brushes; means for operating said brush switching means for a particular segment system when certain segments in the segment system of the next less significant digit are energized; a null junction circuit for each digit of said command and position signals, each of said circuits having a null junction to which the stepped currents for a particular digit from both of said numerical signals is conducted, and a pair of current-valving means disposed on opposite sides of said null junction for producing an output signal corresponding in sign and amount to the error difference between said two stepped currents; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; reversible motor means for altering said position; relay means for driving said motor means in either of its directions in response to the error signal produced by said null junction circuits; and brake means for braking said motor means when said error signal from said null junction circuits is in the vicinity of zero.

14. An automatic positioning system as described in claim 13 which includes: relay means for retracting said brushes from the circular segment systems corresponding to at least one least significant digit; relay means for short circuiting the leading and lagging brushes for the least significant digit remaining in brush contact after said brush lifting relay has been actuated; means for actuating said aforementioned brush lifting and brush short circuiting relays until said null circuits produce a false zero system corresponding to a zero error in the absence of the least significant digits effected by said brush lifting relays; and relay means for switching said positioning motor to low speed when said least significant digit brushes are restored to segment contacting position.

15. An automatic positioning system as described in claim 13 in which said positioning motor is energized through a pair of relays, one for each of its directions of rotation, and said motor relays are in turn operated by relays receiving the output of said null junction circuits, and position limit switches are introduced into the circuit between said two pairs of relays for simultaneously disconnecting said motor from the power source and applying said brake when said limit switches sense that said position has reached one of its limits.

16. An automation system for a machine tool for selectively executing any desired sequence of operations of said tool on a workpiece mounted on a movable workpiece-support at a series of positions of said workpiece, which system includes: a tape memory means having a record of a series of workpiece positions and of a sequence of operations for each of said positions, said tape being adapted to be advanced through a reading means in a reading direction in a step-wise manner, and having all the data for one workpiece position and the sequence of operations for that position in a one-step area of said tape transverse to said reading direction, and adapted to be read simultaneously by said reading means at one of said step-wise advancements; a memory-stepping motor for advancing said tape memory means one step at a time; memory reading means for reading all the information in a row equivalent to one step position of said memory means, said reader including a command current-stepping circuit for producing a stepped-current signal corresponding to each digit in a numerical signal for each coordinate of said workpiece position, and simultaneously, a plurality of operation signals, indicating an identifying number for a desired operation for each of several operations in a sequence at said workpiece position; means for scanning said operation signals, including a scanning-stepping motor for detecting the operation identification number for each operation in said sequence recorded in a one-step area of said memory; means responsive to said scanning means for operating said machine tool according to said sequence of operations; means responsive to said machine tool for advancing said scanning-stepping motor at the completion of each operation in said sequence; means responsive to said scanning device for advancing said memory-stepping motor upon completion of the sequence of operations of one of said tape steps; means for delaying the beginning of a sequence of operations at a new workpiece position until said workpiece has reached a no-error signal position; a rotating mechanism corresponding to position and having a rotational output shaft for each digit in a number corresponding to said position; a series of circular segment systems, one system for each digit of said numerical signal, and each of said segment systems including a separately electrically conductive segment for each value of the digit of said system; a position current-stepping circuit associated with each of said segment systems, said circuit including a connection to each of said segments in said system, an output connection, and a series of impedance means in said circuit adapted to produce an output current at said output line corresponding to the value for the digit of the particular segment contacted by the brushes thereof; a null junction circuit for each digit of said two numerical signals, each of said circuits having a null junction to which the stepped currents for a particular digit from both of said numerical signal sources is conducted, and a pair of current-valving means disposed on opposite sides of said null junction for producing an output signal corresponding in sign and amount to the error difference between said two stepped currents; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; reversible motor means for altering said position; relay means for driving said motor means in either of its directions in response to the error signal produced by said null junction circuits; and brake means for braking said motor means when said error signal from said null junction circuits is in the vicinity of zero.

17. An automation system for a machine tool for selectively executing any desired sequence of operations of said tool on a workpiece mounted on a movable workpiece-support at a series of positions of said workpiece, which system includes: a tape memory means having a record of a series of workpiece positions and of a sequence of operations for each of said positions, said tape being adapted to be advanced through a reading means in a reading direction in a step-wise manner, and having all the data for one workpiece position and the sequence of operations for that position in a one-step area of said tape transverse to said reading direction, and adapted to read simultaneously by said reading means at one of said step-wise advancements; a memory-stepping motor for advancing said tape memory means one step at a time; memory reading means for reading all the information in a row equivalent to one step position of said memory means, said reader including a command current-stepping current for producing a stepped-current signal corresponding to each digit in a numerical signal for each coordinate of said workpiece position, and simultaneously, a plurality of operation signals, indicating an identifying number for a desired operation for each of several operations in a sequence at said workpiece position; means for scanning said operation signals, including a scanning-stepping motor for detecting the operation identification number for each operation in said sequence recorded in a one-step area of said memory; means responsive to said scanning means for operating said machine tool according to said sequence of operations; means responsive to said machine tool for advancing said scanning-stepping motor at the completion of each operation in said sequence; means responsive to said scanning device for advancing said memory-stepping motor upon completion of the sequence of operations at one of said tape steps; means for delaying the beginning of a sequence of operations at a new workpiece position until said workpiece has reached a no-error signal position; a rotating mechanism corresponding to each position coordinate and having a rotational output shaft for each digit in a number corresponding to said position; a series of circular segment systems, one system for each of said output shafts, and each of said segment systems including a separately electrically conductive segment for each value of the digit of said system; a leading brush and a leading brush slip ring means associated with each of said circular segment systems, said leading brush being adapted to sweep around said circular segment system placing each of said segments in turn in electrical communication with said leading brush slip ring means; a lagging brush and a lagging brush slip ring means associated with each of said circular segment systems except that for the least significant digits of each coordinate, said lagging brush being adapted to sweep over said circular segment system at least one segment behind said leading brush, and to make electrical contact between successive segments in said system and said lagging brush slip ring means; a position current-stepping circuit associated with each of said segment systems, said circuit including a connection to each of said segments in said system, an output connection, and a series of impedance means in said circuit adapted to produce an output current at said output line corresponding to the value for the digit of the particular segment contacted by the brushes thereof; brush switching means associated with each of said sets of leading and lagging brushes and adapted to selectively energize either of said brushes; means for operating said brush switching means for a particular segment system when certain segments in the segment system of the next less significant digit are energized; electrical relay means for electrically withdrawing segment systems for at least one of the least significant digits from said series of segment systems during high speed movement of said movable workpiece support; a null junction circuit for each digit of said two numerical signals, each of said circuits having a null junction to which the stepped currents for a particular digit from both said command and said position current-stepping circuits are conducted, and current-valving means for producing an output signal corresponding in sign and amount to the error difference between said two stepped currents; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; a relay driver circuit for each position coordinate for receiving a net signal from said null junction circuits for said position coordinate, said circuit including electronic valve means for delivering motor-driving signals when an error difference exists between said command and said position and a brake signal when said error is zero; reversible motor means for altering the position of said movable workpiece-support; motor relay means for driving said motor means in either of its directions in response to the error signal produced by said relay driver circuit; and brake means for braking said motor means when said error signal from said null junction circuits is in the vicinity of zero.

18. An automation system as claimed in claim 17 in which said null circuits are each comprised of semiconductor devices and associated resistances for applying a supplied power selectively to positive and negative drive output terminals in correspondence with said input signals to said null circuits.

19. An automation system for a machine tool for selectively executing any desired sequence of operations of said tool on a workpiece mounted on a movable workpiece-support at a series of positions of said workpiece, which system includes: a tape memory means having a record of a series of workpiece positions and of a sequence of operations for each of said positions, said tape being adapted to be advanced through a reading means in a reading direction in a step-wise manner, and having all the data for one workpiece position and the sequence of operations for that position in a one-step area of said tape transverse to said reading direction, and adapted to read simultaneously by said reading means at one of said step-wise advancements; a memory-stepping motor for advancing said tape memory means one step at a time; memory reading means for reading all the information in a row equivalent to one step position of said memory means, said reader including a command current-stepping current for producing a stepped-current signal corresponding to each digit in a numerical signal for each coordinate of said workpiece position, and simultaneously, a plurality of operation signals, indicating an identifying number for a desired operation for each of several operations in a sequence at said workpiece position; means for scanning said operation signals, including a scanning-stepping motor for detecting the operation identification number for each operation in said sequence recorded in a one-step area of said memory; means responsive to said scanning means for operating said machine tool according to said sequence of operations; means responsive to said machine tool for advancing said scanning-stepping motor at the completion of each operation in said sequence; means responsive to said scanning device for advancing said memory-stepping motor upon completion of the sequence of operations at one of said tape steps; means for delaying the beginning of a sequence of operations at a new workpiece position until said workpiece has reached a no-error signal position; a rotating mechanism corresponding to each position coordinate and having a rotational output shaft for each digit in a number corresponding to said position; a series of circular segment systems, one system for each of said output shafts, and each of said segment systems including a separately electrically conductive segment for each value of the digit of said system; a leading brush and a leading brush slip ring means associated with each of said circular segment systems, said leading brush being adapted to sweep around said circular segment system placing each of said segments in turn in electrical communication with said leading brush slip ring means; a lagging brush and a lagging brush slip ring means associated with each of said circular segment systems except that for the least significant digits of each coordinate, said lagging brush being adapted to sweep over said circular segment system at least one segment behind said leading brush, and to make electrical contact between successive segments in said system and said lagging brush slip ring means; a position current-stepping circuit associated with each of said segment systems, said circuit including a connection to each of said segments in said system, an output connection, and a series of impedance means in said circuit adapted to produce an output current at said output line corresponding to the value for the digit of the particular segment contacted by the brushes thereof; brush switching means associated with each of said sets of leading and lagging brushes and adapted to selectively energize either of said brushes; means for operating said brush switching means for a particular segment system when certain segments in the segment system of the next less significant digit are energized; electrical relay means for electrically withdrawing segment systems for at least one of the least significant digits from said series of segment systems during high speed movement of said movable workpiece support; a null junction circuit for each digit of said two numerical signals, each of said circuits having a null junction to which the stepped currents for a particular digit from both said command and said position current-stepping circuits are conducted, and current-valving means for producing an output signal corresponding in sign and amount to the error difference between said two stepped current; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; a relay driver circuit for each position coordinate for receiving a net signal from said null junction circuits for said position coordinate, said circuit including electronic valve means for delivering motor-driving signals when an error difference exists between said command and said position and a brake signal when said error is zero; reversible motor means for altering the position of said movable workpiece-support; motor relay means for driving said motor means in either of its directions in response to the error signal produced by said relay driver circuit; brake means for braking said motor means when said error signal from said null junction circuits is in the vicinity of zero; speed control means for said motor; and relay means for operating said speed control means to reduce the speed of said motor and to restore said less significant segment systems to said segment system whenever a brake signal has been received by said brake means from said relay driver circuit.

20. A position-indicating system for producing a numerical signal corresponding to a shaft position, which system includes: a series of circular segment systems, one system for each digit of said numerical signal, and each of said segment systems including a separate electrically conductive segment for each value of the digit of said system; a leading brush and a leading brush slip ring means associated with at least the more significant digit circular segment systems, said leading brush being adapted to sweep around said circular segment system and to make electrical contact between successive segments in said system and said leading brush slip ring means; a lagging brush and a lagging brush slip ring means associated with each of said segment systems having a leading brush, said lagging brush being adapted to sweep around said circular segment system at least one segment behind said leading brush, and to make electrical contact between successive segments in said system and said lagging brush slip ring means; position means for rotating the leading and lagging brushes for the segment system corresponding to an input digit of said numerical signal; a series of rotating means for each of the other digits of said numerical signal, each of said rotating means being related to the rotations of said input digit rotating means to change the number of rotations in proportion to the relationship of the digits, and each of said rotating means rotating one of said leading and lagging brush systems associated with one of said segment systems; a signaling circuit associated with each of said segment systems, said circuit including a connection to each of said segments in said system, an output connection, and means in said circuit adapted to produce an output signal at said output connection determined by the particular segment contacted in the associated segment system; brush switching means associated with each of said sets of leading and lagging brushes and adapted to selectively energize either of said brushes; and means for operating said brush switching means for a particular segment system when certain segments in the segment system of the next less significant digit are energized.

21. A position-indicating system for producing a numerical signal corresponding to a shaft position, which system includes: a pair of concentric circular segment systems, an outer system for a less significant digit of said numerical signal, and an inner system for a more significant digit, each of said segment systems including a separate electrically conductive segment for each value of the digit of said system; a leading brush and a leading brush slip ring means associated with said inner circular segment system, said leading brush being adapted to sweep around said inner system placing each of said segments in turn in electrical communication with said leading brush slip ring means; a lagging brush and a lagging brush slip ring means associated with said inner circular segment systems, said lagging brush being adapted to sweep over said inner system one segment behind said leading brush to make electrical contact between successive segments in said system and said lagging brush slip ring means; an outer brush assembly and outer brush slip ring, said outer brush assembly having interconnected contacts spaced around said outer segment system, said contacts being equal in number to the possible values of the digit of said outer segment system, and adapted to electrically connect said outer brush slip ring to at least one of said outer segments through at least one of said outer brush contacts to repeat the count of all said outer segments once for each inner segment; position means for rotating all of said brushes around the common axis of said segment system and said slip rings; a signaling circuit associated with each of said segment systems, said circuit including a connection to each of said segments in said system, an output connection, and means in said circuit adapted to produce an output signal at said output connection determined by the particular segment contacted in the associated segment system; brush switching means associated with said leading and lagging brushes and adapted to selectively energize either of said brushes; and means for operating said brush switching means for a particular segment system when a certain segment in the outer segment system is energized.

22. A numerical comparison system which includes: an input shaft means adapted to be rotated to indicate by its position any value within a range of a predetermined numerical signal; a series of circular segment systems, one system for each digit of said numerical signal, and each of said segment systems including a separate electrically conductive segment for each value of the digit of said system; a leading brush and a leading brush slip ring means associated with each of said circular segment systems, said leading brush being adapted to sweep around said circular segment system placing each of said segments in turn in electrical communication with said leading brush slip ring means; a lagging brush and a lagging brush slip ring means associated with at least the more significant of said circular segment systems, said lagging brush being adapted to sweep over said circular segment system at least one segment behind said leading brush, and to make electrical contact between successive segments in said system and said lagging brush slip ring means; position means for rotating the leading and lagging brushes for one of said segment systems in response to said input shaft rotation; a series of rotating means for each of the other digits of said numerical signal, each of said rotating means being related to the rotations of said input digit rotating means to change the number of rotations in proportion to the relationship of the digits, and each of said rotating means rotating one of said leading and lagging brush systems associated with one of said segment systems; a signal circuit associated with each of said segment systems, said circuit including a connection to each of said segments in said system, an output connection, and means in said circuit adapted to produce an output signal at said output connection corresponding to the value for the digit of the particular segment contacted in the associated segment system; brush switching means associated with each of said sets of leading and lagging brushes and adapted to selectively energize either of said brushes; means for operating said brush switching means for a particular segment system when certain segments in the segment system of the next less significant digits are energized; a second source of signals, one signal value for each digit of said numerical signal, and each of said signals corresponding in stepped value to a digit of a numerical signal; a null junction circuit for each digit of said two numerical signals, each of said circuits having a null junction to which the signal for a particular digit from both of said numerical signals is conducted, and a pair of signal control means disposed on the opposite side of said null junction for producing an output signal corresponding in sign to the error difference between said two signals; and electrical interconnection means between each of said null junction circuits and the null junction circuit of the next less significant digit to drive the circuit for the less significant digit to the same sign of error output as that which exists in the circuit of the more significant digit, unti lthe error difference of the latter is reduced to zero.

23. An automatic positioning system which includes: a command source for producing a numerical command signal consisting of an electrical signal for each digit of the numerical command signal; a rotating mechanism corresponding to position and having a rotational output digit shaft for each digit in a number corresponding to said position; a series of circular segment systems, one system for each digit of said numerical signal, and each of said segment systems including a separate electrically conductive segment for each value of the digit of said system; a leading brush and a leading brush slip ring means associated with each of said digit shafts, said leading brush being adapted to sweep around said circular segment system placing each of said segments in turn in electrical communication with said leading brush slip ring means; a lagging brush and a lagging brush slip ring means associated with each of said digit shafts, said lagging brush being adapted to sweep over said circular segment system at least one segment behind said leading brush, and to make electrical contact between successive segments in said system and said lagging brush slip ring means; an electrical signal circuit associated with each of said segment systems, said circuit including a connection to each of said segments in said system, an output connection, and a series of impedance means in said circuit adapted to produce at said output connection an electrical output position signal corresponding to the value for the digit of the particular segment contacted in the associated segment system; brush switching means associated with each of said sets of leading and lagging brushes and adapted to selectively energize either of said brushes; means for operating said brush switching means for a particular segment system when certain segments in the segment system of the next less significant digit are energized; a null junction circuit for each digit of said command and position signals, each of said circuits having a null junction to which the signal for a particular digit from both of said numerical signal is conducted, and a pair of electronic valving means disposed on opposite sides of said null junction for producing an output signal corresponding to the error difference between said two electrical signals; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; reversible motor means for altering said position; relay means for driving said motor means in either of its directions in response to the error signal produced by said null junction circuits; and brake means for braking said motor means when said error signal from said null junction circuits is in the vicinity of zero.

24. An automation system for a machine tool for selectively executing any desired sequence of operations of said tool on a workpiece mounted on a movable workpiece-support at a series of positions of said workpiece, which system includes; a tape memory means having a record of a series of workpiece positions and of a sequence of operations for each of said positions, said tape being adapted to be advanced through a reading means in a reading direction in a step-wise manner, and having all the data for one workpiece position and the sequence of operations for that position in a one-step area of said tape transverse to said reading direction, and adapted to be read simultaneously by said reading means at one of said step-wise advancements; a memory-stepping motor for advancing said tape memory means one step at a time; memory reading means for reading all the information in a row equivalent to one step position of said memory means, said reader including an electrical command signal circuit for producing an electrical command signal corresponding to each digit in a numerical signal for each coordinate of said workpiece position, and simultaneously, a plurality of operation signals, indicating an identifying number for a desired operation of each of several operations in a sequence at said workpiece position; means for scanning said operation signals, including a scanning-stepping motor for detecting the operation identification number for each operation in said sequence recorded in a one-step area of said memory; means responsive to said scanning means for operating said machine tool according to said sequence of operations; means responsive to said machine tool for advancing said scanning-stepping motor at the completion of each operation in said sequence; means responsive to said scanning device for advancing said memory-stepping motor upon completion of the sequence of operations at one of said tape steps; means for delaying the beginning of a sequence of operations at a new workpiece position until said workpiece has reached a no-error signal position; a rotating mechanism corresponding to each position coordinate and having a rotational output shaft for each digit in a number corresponding to said position; a series of circular segment systems, one system for each of said output shafts, and each of said segment systems including a separately electrically conductive segment for each value of the digit of said system; a leading brush and a leading brush slip ring means associated with each of said circular segment systems, said leading brush being adapted to sweep around said circular segment system placing each of said segments in turn in electrical communication with said leading brush slip ring means; a lagging brush and a lagging brush slip ring means associated with each of said circular segment systems except that for the least significant digits of each coordinate, said lagging brush being adapted to sweep over said circular segment system at least one segment behind said leading brush, and to make electrical contact between successive segments in said system and said lagging brush slip ring means; a position signal circuit associated with each of said segment systems, said circuit including a connection to each of said segments in said system, an output connection, and a series of impedance means in said circuit adapted to produce an electrical signal at said output connection corresponding to the value for the digit of the particular segment contacted by the brushes thereof; brush switching means associated with each of said sets of leading and lagging brushes and adapted to selectively energize either of said brushes; means for operating said brush switching means for a particular segment system when certain segments in the segment system of the next less significant digit are energized; a null junction circuit for each digit of said two numerical signals, each of said circuits having a null junction to which the signals for a particular digit from both said command and said position circuits are conducted, an electronic valving means for producing an output signal corresponding in sign and amount to the error difference between said command signals and said position signals; electrical interconnection means between each of said null junction circuits and the null junction circuit of the next less significant digit to drive the circuit for the less significant digit to the same sign of error output as that which exists in the circuit of the more significant digit, until the error difference of the latter is reduced to zero; a relay driver circuit for each position coordinate for receiving a net signal from said null junction circuits for said position coordinate, said circuit including electronic valve means for delivering motor-driving signals when an error difference exists between said command and said position and a brake signal when said error is zero; reversible motor means for altering the position of said movable workpiece-support; motor relay means for driving said motor means in either of its directions in response to the error signal produced by said relay driver circuit; and brake means for braking said motor means when said error signal from said null junction circuits is in the vicinity of zero.

References Cited in the file of this patent

UNITED STATES PATENTS

| | | |
|---|---|---|
| 2,594,782 | Makant et al. | Apr. 29, 1952 |
| 2,736,852 | Nelson | Feb. 28, 1956 |
| 2,832,023 | Gough | Apr. 22, 1958 |